US008176515B2

(12) United States Patent
Ahmad et al.

(10) Patent No.: US 8,176,515 B2
(45) Date of Patent: *May 8, 2012

(54) BROWSER FOR USE IN NAVIGATING A BODY OF INFORMATION, WITH PARTICULAR APPLICATION TO BROWSING INFORMATION REPRESENTED BY AUDIOVISUAL DATA

(75) Inventors: Subutai Ahmad, Palo Alto, CA (US); Neal A. Bhadkamkar, Palo Alto, CA (US); Steve B. Cousins, Mountain View, CA (US); Emanuel E. Farber, New York, NY (US); Paul A. Freiberger, San Mateo, CA (US); Christopher D. Horner, Redmond, WA (US); Philippe P. Piernot, Palo Alto, CA (US); Brygg A. Ullmer, Cambridge, MA (US)

(73) Assignee: Interval Licensing LLC, Seattle, WA (US)

( * ) Notice: Subject to any disclaimer, the term of this patent is extended or adjusted under 35 U.S.C. 154(b) by 623 days.

This patent is subject to a terminal disclaimer.

(21) Appl. No.: 11/682,201

(22) Filed: Mar. 5, 2007

(65) Prior Publication Data
US 2007/0204319 A1 Aug. 30, 2007

Related U.S. Application Data

(63) Continuation of application No. 09/866,956, filed on May 29, 2001, now abandoned, which is a continuation of application No. 08/761,030, filed on Dec. 5, 1996, now Pat. No. 6,263,507.

(51) Int. Cl.
G06F 3/00 (2006.01)
G06F 13/00 (2006.01)
H04N 5/445 (2006.01)
H04N 7/16 (2006.01)

(52) U.S. Cl. ........... 725/43; 725/41; 725/40; 725/51; 725/141; 715/720; 715/721

(58) Field of Classification Search ............ 725/43, 725/41, 40, 52, 51; 715/719, 721
See application file for complete search history.

(56) References Cited

U.S. PATENT DOCUMENTS
3,884,403 A 5/1975 Brewer
(Continued)

FOREIGN PATENT DOCUMENTS
DE 4408131 7/1995
(Continued)

OTHER PUBLICATIONS
Elliot, E., "Multiple Views of Digital Video," MIT Media Laboratory, Interactive Cinema Group, Mar. 23, 1992, 4 pages.
(Continued)

*Primary Examiner* — Pankaj Kumar
*Assistant Examiner* — Usha Raman

(57) ABSTRACT

A system and method for review of news content (audio, video and/or textual news content), such that an overview of the news content can be quickly ascertained and flexibility in the manner in which it is presented are provided. News programs (e.g. television news programs) and news stories (e.g., on-line news) are acquired and the system enables the user to easily move among and randomly access the segments of news programs and quickly locate the segments of a particular subject. News stories related to the segment of news program being viewed can be identified and displayed. Flexible playback allows speeding-up the display of the news program while displaying summary of one or more program segments and accelerating playback of a paused program after resuming from the pause. The system can additionally indicate to the user which news story is currently being viewed, and which news stories have already been viewed.

18 Claims, 6 Drawing Sheets

U.S. PATENT DOCUMENTS

| | | |
|---|---|---|
| 3,919,475 A | 11/1975 | Dukich et al. |
| 4,033,335 A | 7/1977 | Nickles |
| 4,051,534 A | 9/1977 | Dukich et al. |
| 4,131,919 A | 12/1978 | Lloyd et al. |
| 4,217,609 A | 8/1980 | Hatori et al. |
| 4,260,229 A | 4/1981 | Bloomstein |
| 4,283,735 A | 8/1981 | Jagger |
| 4,319,286 A | 3/1982 | Hanpachern |
| 4,390,904 A | 6/1983 | Johnston et al. |
| 4,446,997 A | 5/1984 | Himberg |
| 4,520,404 A | 5/1985 | Von Kohorn |
| 4,524,381 A | 6/1985 | Konishi et al. |
| 4,526,308 A | 7/1985 | Dovey |
| 4,527,201 A | 7/1985 | Cappels |
| 4,536,066 A | 8/1985 | Bauer et al. |
| 4,574,354 A | 3/1986 | Mihalik et al. |
| 4,602,297 A | 7/1986 | Reese |
| 4,605,964 A | 8/1986 | Chard et al. |
| 4,605,973 A | 8/1986 | Von Kohorn |
| 4,618,895 A | 10/1986 | Wright |
| 4,714,184 A | 12/1987 | Young et al. |
| 4,739,398 A | 4/1988 | Thomas et al. |
| 4,750,052 A | 6/1988 | Poppy et al. |
| 4,750,053 A | 6/1988 | Allen |
| 4,777,537 A | 10/1988 | Ueno et al. |
| 4,782,401 A | 11/1988 | Faerber et al. |
| 4,814,876 A | 3/1989 | Horio et al. |
| 4,827,532 A | 5/1989 | Bloomstein |
| 4,837,817 A | 6/1989 | Maemori et al. |
| 4,841,575 A | 6/1989 | Welsh et al. |
| 4,843,484 A | 6/1989 | Kanamaru et al. |
| 4,847,543 A | 7/1989 | Fellinger |
| 4,913,539 A | 4/1990 | Lewis |
| 4,930,160 A | 5/1990 | Vogel et al. |
| 4,934,821 A | 6/1990 | Morton |
| 4,965,825 A | 10/1990 | Harvey et al. |
| 4,989,104 A | 1/1991 | Schulein et al. |
| 5,012,334 A | 4/1991 | Etra |
| 5,012,335 A | 4/1991 | Cohodar |
| 5,025,394 A | 6/1991 | Parke |
| 5,038,217 A | 8/1991 | Hayashi et al. |
| 5,040,081 A | 8/1991 | McCutchen |
| 5,109,482 A | 4/1992 | Bohrman |
| 5,136,655 A | 8/1992 | Bronson |
| 5,146,353 A | 9/1992 | Isoguchi et al. |
| 5,157,742 A | 10/1992 | Niihara |
| 5,172,281 A | 12/1992 | Ardis et al. |
| 5,175,769 A | 12/1992 | Hejna, Jr. et al. |
| 5,177,796 A | 1/1993 | Feig et al. |
| 5,179,449 A | 1/1993 | Doi et al. |
| 5,182,641 A | 1/1993 | Diner et al. |
| 5,185,667 A | 2/1993 | Zimmermann |
| 5,187,571 A | 2/1993 | Braun et al. |
| 5,226,093 A | 7/1993 | Iwase et al. |
| 5,233,654 A | 8/1993 | Harvey et al. |
| 5,239,428 A | 8/1993 | Nishida et al. |
| 5,241,428 A | 8/1993 | Goldwasser et al. |
| 5,249,289 A | 9/1993 | Thamm et al. |
| 5,253,061 A | 10/1993 | Takahama et al. |
| 5,253,066 A | 10/1993 | Vogel |
| 5,253,275 A | 10/1993 | Yurt et al. |
| 5,262,856 A | 11/1993 | Lippman et al. |
| 5,265,180 A | 11/1993 | Golin |
| 5,267,042 A | 11/1993 | Tsuchiya et al. |
| 5,295,089 A | 3/1994 | Ambasz |
| 5,299,019 A | 3/1994 | Pack et al. |
| 5,305,400 A | 4/1994 | Butera et al. |
| 5,317,730 A | 5/1994 | Moore et al. |
| 5,329,320 A | 7/1994 | Yifrach et al. |
| 5,333,091 A | 7/1994 | Iggulden et al. |
| 5,343,251 A | 8/1994 | Nafeh |
| 5,377,051 A | 12/1994 | Lane et al. |
| 5,384,703 A | 1/1995 | Withgott et al. |
| 5,396,287 A | 3/1995 | Cho et al. |
| 5,396,583 A | 3/1995 | Chen et al. |
| 5,404,316 A | 4/1995 | Klingler et al. |
| 5,406,626 A | 4/1995 | Ryan |
| 5,416,310 A | 5/1995 | Little |
| 5,420,801 A | 5/1995 | Dockter et al. |
| 5,421,031 A | 5/1995 | De Bey et al. |
| 5,428,774 A | 6/1995 | Takahashi et al. |
| 5,430,835 A | 7/1995 | Williams et al. |
| 5,436,542 A | 7/1995 | Petelin et al. |
| 5,436,653 A | 7/1995 | Ellis et al. |
| 5,438,357 A | 8/1995 | McNelley |
| 5,438,362 A | 8/1995 | Tabuchi et al. |
| 5,438,423 A | 8/1995 | Lynch et al. |
| 5,444,478 A | 8/1995 | Lelong et al. |
| 5,467,271 A | 11/1995 | Abel et al. |
| 5,467,288 A | 11/1995 | Fasciano et al. |
| 5,473,379 A | 12/1995 | Horne |
| 5,477,331 A | 12/1995 | Yamaguchi et al. |
| 5,486,852 A | 1/1996 | Arai et al. |
| 5,488,409 A | 1/1996 | Yuen et al. |
| 5,510,830 A | 4/1996 | Ohia et al. |
| 5,514,861 A | 5/1996 | Swartz et al. |
| 5,524,051 A | 6/1996 | Ryan |
| 5,524,193 A | 6/1996 | Covington et al. |
| 5,528,282 A | 6/1996 | Voeten et al. |
| 5,537,151 A | 7/1996 | Orr et al. |
| 5,537,530 A | 7/1996 | Edgar et al. |
| 5,539,483 A | 7/1996 | Nalwa |
| 5,546,145 A | 8/1996 | Bernardi et al. |
| 5,550,754 A | 8/1996 | McNelley et al. |
| 5,555,463 A | 9/1996 | Staron et al. |
| 5,572,261 A | 11/1996 | Cooper |
| 5,575,443 A | 11/1996 | Honeycutt |
| 5,583,565 A | 12/1996 | Cortjens et al. |
| 5,583,571 A | 12/1996 | Friedland |
| 5,583,652 A | 12/1996 | Ware |
| 5,590,195 A | 12/1996 | Ryan |
| 5,592,626 A | 1/1997 | Papadimitriou et al. |
| 5,594,498 A | 1/1997 | Fraley |
| 5,598,352 A | 1/1997 | Rosenau et al. |
| 5,604,551 A | 2/1997 | Choi et al. |
| 5,606,359 A | 2/1997 | Youden et al. |
| 5,608,839 A | 3/1997 | Chen |
| 5,612,742 A | 3/1997 | Krause et al. |
| 5,613,032 A | 3/1997 | Cruz et al. |
| 5,613,909 A | 3/1997 | Stelovsky |
| 5,614,940 A | 3/1997 | Cobbley et al. |
| 5,623,173 A | 4/1997 | Fasullo et al. |
| 5,635,982 A | 6/1997 | Zhang et al. |
| 5,664,227 A | 9/1997 | Mauldin et al. |
| 5,666,159 A | 9/1997 | Parulski et al. |
| 5,671,014 A | 9/1997 | Ito et al. |
| 5,678,793 A | 10/1997 | Hill |
| 5,682,597 A | 10/1997 | Ganek et al. |
| 5,684,514 A | 11/1997 | Branscomb |
| 5,687,095 A | 11/1997 | Haskell et al. |
| 5,689,300 A | 11/1997 | Shibata et al. |
| 5,689,648 A | 11/1997 | Diaz et al. |
| 5,692,213 A | 11/1997 | Goldberg et al. |
| 5,692,661 A | 12/1997 | Kellerman |
| 5,694,474 A | 12/1997 | Ngo et al. |
| 5,701,582 A | 12/1997 | DeBey |
| 5,703,655 A | 12/1997 | Corey et al. |
| 5,703,795 A | 12/1997 | Mankovitz |
| 5,713,021 A | 1/1998 | Kondo et al. |
| 5,717,814 A | 2/1998 | Abecassis |
| 5,717,869 A | 2/1998 | Moran et al. |
| 5,721,823 A | 2/1998 | Chen et al. |
| 5,724,646 A | 3/1998 | Ganek et al. |
| 5,726,660 A | 3/1998 | Purdy et al. |
| 5,726,717 A | 3/1998 | Peters et al. |
| 5,729,108 A | 3/1998 | Steele et al. |
| 5,729,741 A | 3/1998 | Liaguno et al. |
| 5,737,009 A | 4/1998 | Payton |
| 5,740,037 A | 4/1998 | McCann et al. |
| 5,742,339 A | 4/1998 | Wakui et al. |
| 5,742,517 A | 4/1998 | Van Den Bosch |
| 5,749,010 A | 5/1998 | McCumber |
| 5,751,336 A | 5/1998 | Aggarwal et al. |
| 5,751,806 A | 5/1998 | Ryan |
| 5,752,113 A | 5/1998 | Borden |
| 5,754,230 A | 5/1998 | Tsuruta et al. |
| 5,758,181 A | 5/1998 | Becker |

| | | | |
|---|---|---|---|
| 5,765,133 A | 6/1998 | Antoniol et al. | |
| 5,768,640 A | 6/1998 | Takahashi et al. | |
| 5,768,648 A | 6/1998 | Skipp et al. | |
| 5,774,498 A | 6/1998 | Oya et al. | |
| 5,774,664 A | 6/1998 | Hidary et al. | |
| 5,778,181 A * | 7/1998 | Hidary et al. | 725/110 |
| 5,791,907 A | 8/1998 | Ramshaw et al. | |
| 5,793,367 A | 8/1998 | Taguchi et al. | |
| 5,793,971 A | 8/1998 | Fujita et al. | |
| 5,796,426 A | 8/1998 | Gullichsen et al. | |
| 5,805,156 A | 9/1998 | Richmond et al. | |
| 5,809,161 A | 9/1998 | Auty et al. | |
| 5,818,439 A | 10/1998 | Nagasaka et al. | |
| 5,818,510 A | 10/1998 | Cobbley et al. | |
| 5,822,493 A | 10/1998 | Uehara et al. | |
| 5,826,206 A | 10/1998 | Nemeth | |
| 5,828,994 A | 10/1998 | Covell et al. | |
| 5,831,662 A | 11/1998 | Payton | |
| 5,835,667 A | 11/1998 | Wactlar et al. | |
| 5,838,874 A | 11/1998 | Ng et al. | |
| 5,844,693 A | 12/1998 | Miyata et al. | |
| 5,861,881 A * | 1/1999 | Freeman et al. | 715/201 |
| 5,870,143 A | 2/1999 | Suzuki et al. | |
| 5,880,788 A | 3/1999 | Bregler | |
| 5,884,141 A | 3/1999 | Inoue et al. | |
| 5,886,739 A | 3/1999 | Winningstad | |
| 5,892,536 A | 4/1999 | Logan et al. | |
| 5,893,062 A | 4/1999 | Bhadkamkar et al. | |
| 5,917,542 A | 6/1999 | Moghadam et al. | |
| 5,926,205 A | 7/1999 | Krause et al. | |
| 5,929,904 A | 7/1999 | Uchida | |
| 5,936,659 A | 8/1999 | Viswanathan et al. | |
| 5,940,004 A | 8/1999 | Fulton | |
| 5,946,050 A * | 8/1999 | Wolff | 348/553 |
| 5,974,235 A | 10/1999 | Nunally et al. | |
| 5,982,979 A | 11/1999 | Omata et al. | |
| 5,999,173 A | 12/1999 | Ubillos | |
| 6,005,564 A | 12/1999 | Ahmad et al. | |
| 6,009,204 A | 12/1999 | Ahmad | |
| 6,018,359 A | 1/2000 | Kermode et al. | |
| 6,020,883 A | 2/2000 | Herz et al. | |
| 6,025,837 A | 2/2000 | Matthews, III et al. | |
| 6,041,142 A | 3/2000 | Rao et al. | |
| 6,061,055 A | 5/2000 | Marks | |
| 6,061,056 A | 5/2000 | Menard et al. | |
| 6,069,621 A * | 5/2000 | Schupak | 715/717 |
| 6,072,542 A | 6/2000 | Wilcox et al. | |
| 6,081,551 A | 6/2000 | Etoh et al. | |
| 6,118,925 A | 9/2000 | Murata et al. | |
| 6,141,693 A | 10/2000 | Perlman et al. | |
| 6,160,950 A | 12/2000 | Shimazaki et al. | |
| 6,172,675 B1 | 1/2001 | Ahmad et al. | |
| 6,212,657 B1 | 4/2001 | Wang et al. | |
| 6,236,395 B1 | 5/2001 | Sezan et al. | |
| 6,243,725 B1 | 6/2001 | Hempleman et al. | |
| 6,259,817 B1 | 7/2001 | Ahmad | |
| 6,263,507 B1 | 7/2001 | Ahmad et al. | |
| 6,266,085 B1 | 7/2001 | Kato | |
| 6,272,231 B1 | 8/2001 | Maurer et al. | |
| 6,282,362 B1 | 8/2001 | Murphy et al. | |
| 6,297,845 B1 | 10/2001 | Kuhn et al. | |
| 6,351,599 B1 | 2/2002 | Komeno et al. | |
| 6,360,202 B1 | 3/2002 | Bhadkamkar et al. | |
| 6,360,234 B2 | 3/2002 | Jain et al. | |
| 6,366,296 B1 | 4/2002 | Boreczky et al. | |
| 6,377,519 B1 | 4/2002 | Lee et al. | |
| 6,385,386 B1 | 5/2002 | Aotake et al. | |
| 6,404,811 B1 | 6/2002 | Cvetko et al. | |
| 6,452,969 B1 | 9/2002 | Yim | |
| 6,502,139 B1 | 12/2002 | Birk et al. | |
| 6,563,532 B1 | 5/2003 | Strub et al. | |
| 6,622,305 B1 | 9/2003 | Willard | |
| 6,624,846 B1 | 9/2003 | Lassiter | |
| 6,690,273 B2 | 2/2004 | Thomason | |
| 6,701,528 B1 | 3/2004 | Arsenault et al. | |
| 6,704,750 B2 | 3/2004 | Asazu et al. | |
| 6,728,678 B2 | 4/2004 | Bhadkamkar et al. | |
| 6,782,186 B1 | 8/2004 | Covell et al. | |
| 6,825,875 B1 | 11/2004 | Strub et al. | |
| 6,868,452 B1 | 3/2005 | Eager et al. | |
| 6,880,171 B1 | 4/2005 | Ahmad et al. | |
| 6,901,209 B1 | 5/2005 | Cooper et al. | |
| 6,934,461 B1 | 8/2005 | Strub et al. | |
| 6,961,954 B1 | 11/2005 | Maybury et al. | |
| 6,973,669 B2 * | 12/2005 | Daniels | 725/112 |
| 6,986,156 B1 | 1/2006 | Rodriguez et al. | |
| 6,993,787 B1 | 1/2006 | Kamel et al. | |
| 7,072,575 B2 | 7/2006 | Kang et al. | |
| 7,130,528 B2 | 10/2006 | Blair et al. | |
| 7,143,431 B1 | 11/2006 | Eager et al. | |
| 7,155,735 B1 | 12/2006 | Ngo et al. | |
| 7,194,186 B1 | 3/2007 | Strub et al. | |
| 7,266,771 B1 | 9/2007 | Tow et al. | |
| 7,340,760 B2 | 3/2008 | Wachtfogel et al. | |
| 7,519,271 B2 | 4/2009 | Strub et al. | |
| 7,565,681 B2 | 7/2009 | Ngo et al. | |
| 7,610,358 B2 * | 10/2009 | Benschoter et al. | 709/219 |
| 7,627,890 B2 * | 12/2009 | Schwartz et al. | 725/141 |
| 7,823,067 B2 * | 10/2010 | Grasland et al. | 715/719 |
| 7,890,849 B2 * | 2/2011 | Moraveji et al. | 715/203 |
| 2002/0006266 A1 | 1/2002 | Yoon et al. | |
| 2002/0013949 A1 | 1/2002 | Hejna | |
| 2002/0031331 A1 | 3/2002 | Kwoh et al. | |
| 2002/0049975 A1 * | 4/2002 | Thomas et al. | 725/60 |
| 2002/0073105 A1 | 6/2002 | Noguchi et al. | |
| 2002/0120925 A1 | 8/2002 | Logan | |
| 2002/0157103 A1 | 10/2002 | Song et al. | |
| 2002/0159750 A1 | 10/2002 | Jasinschi et al. | |
| 2002/0170068 A1 | 11/2002 | Rafey et al. | |
| 2003/0043194 A1 | 3/2003 | Lif | |
| 2003/0093790 A1 | 5/2003 | Logan et al. | |
| 2003/0149574 A1 | 8/2003 | Rudman | |
| 2003/0163824 A1 | 8/2003 | Gordon et al. | |
| 2004/0022313 A1 | 2/2004 | Kim | |
| 2004/0078812 A1 | 4/2004 | Calvert | |
| 2004/0123324 A1 | 6/2004 | Sazzad et al. | |
| 2004/0170385 A1 | 9/2004 | Bhadkamkar | |
| 2005/0183127 A1 | 8/2005 | Ngo et al. | |
| 2006/0031879 A1 | 2/2006 | Colter | |
| 2006/0031885 A1 | 2/2006 | Colter | |
| 2006/0031916 A1 | 2/2006 | Colter | |
| 2006/0053470 A1 | 3/2006 | Colter et al. | |
| 2008/0127240 A1 | 5/2008 | Covell et al. | |

FOREIGN PATENT DOCUMENTS

| | | |
|---|---|---|
| EP | 179701 A1 | 4/1986 |
| EP | 0513601 | 11/1992 |
| EP | 0674315 A1 | 9/1995 |
| EP | 0689362 A2 | 12/1995 |
| GB | 2231246 | 11/1990 |
| JP | 1174192 A | 7/1989 |
| JP | 06162166 | 6/1994 |
| JP | 07-114572 | 5/1995 |
| WO | WO-9612240 | 4/1996 |
| WO | WO-9715926 | 5/1997 |

OTHER PUBLICATIONS

Elliot, E., "Watch, Grab, Arrange, See: Thinking with Motion Images via Streams and Collages," Masters Thesis, School of Architecture and Planning, Massachusetts Institute of Technology, Feb. 1993, pp. 3, 5, 7, 9-11, 13-35, 37-49, 51-61, 63-85, 87-99, 101, 103-105.

CNN at Work White Paper, 1994, 22 pages.

Salton et al., "Improving Retrieval Performance by Relevance Feedback," Journal of the American Society for Information Science, vol. 41, No. 4, Jun. 1990, pp. 288-297.

Shibata M., "A Description Model of Video Content and Its Application for Video Structuring," Systems and Computers in Japan, vol. 27, No. 7, Jun. 1996, pp. 70-83.

Yeung M. M. et al., "Efficient Matching and Clustering of Video Shots," IEEE '95 (ICIP), vol. 1, Oct. 1995, pp. 338-341.

Wactlar et al., "Intelligent Access to Digital Video: Informedia Project," Computer, vol. 29, No. 5, May 1996, pp. 46-52.

Sakauchi et al., "Multimedia Database Systems for the Contents Mediator," IEICE Trans. Inf. and Syst., vol. E79-D, No. 6, Jun. 1996, pp. 641-646.

Shahraray et al., "Automatic generation of pictoral transcripts of video programs," SPIE, vol. 2417, Jan. 1995, pp. 512-518.
Lindblad et al., "ViewStation Applications: Implications for Network Traffic," IEEE Journal on Selected Areas in Communications, vol. 13, No. 5, Jun. 1995, pp. 768-777, New York, NY, US.
Horner, C., "NewsTime: A Graphical User Interface to Audio News," Masters Thesis, School of Architecture and Planning, Massachusetts Institute of Technology, Jun. 1993, pp. 1-84.
Hauptmann et al., "Text, Speech, and Vision for Video Segmentation: The Informedia™ Project," AAAI Fall Symposium, Computational Models for Integrating Language and Vision, Nov. 10-12, 1995, 12 pages.
Tennenhouse et al., "The ViewStation: a software-intensive approach to media processing and distribution," Proceedings of the 17th Annual Conference on Research and Development in Information Retrieval, Jul. 3-6, 1994, pp. 104-115.
Zhang et al., "Automatic Parsing of News Video," IEEE Conference on Multimedia Computing and Systems, 1994, pp. 45-54.
Scheirer et al., "Construction and Evaluation of a Robust Multifeature Speech/Music Discriminator," Proc. ICASSP, Apr. 21-24, 1997, pp. 1-4.
Buckley et al., "The Effect of Adding Relevance Information in a Relevance Feedback Environment," Proceedings of the 17th Annual Conference on Research and Development in Information Retrieval, Jul. 3-6, 1994, pp. 292-300.
Roucos et al., "High Quality Time-Scale Modification for Speech," Proceedings of the International Conference on Acoustics, Speech, and Signal Processing, IEEE, 1985, pp. 493-496.
Reynolds, D., "A Gaussian Mixture Modeling Approach to Text-Independent Speaker Identification," Ph.D. Thesis, Dept. of Electrical Engineering, Georgia Institute of Technology, Aug. 1992, pp. 1-154.
"Correlating Audio and Moving-Image Tracks," IBM Technical Disclosure Bulletin, vol. 33, No. 10A, Mar. 1991, pp. 295-296.
"Evolution of Steve Mann's 'existential computer'," 'Personal Imaging', IEEE Computer Society, http://computer.org/pubs/computer/1997/0297loc.htm, 1 page.
"Informedia: Experience on Demand," DARPA/ITO Joint IC and V/IM Principal Investigator Meeting, Oct. 15-17, 1997, 2 pages.
"VideoLogger® SDK: Virage Open Architecture," Datasheet, Virage, Inc., San Mateo, California, 2003, 2 pages.
"VideoLogger®: Automate Video Encoding and Indexing," Datasheet, Virage, Inc., San Mateo, California, 2003, 3 pages.
Arons, B., "Techniques, Perception, and Applications of Time-Compressed Speech," Proceedings of 1992 Conference, American Voice I/O Society, Sep. 1992, 19 pages.
Brooks et al., "Computer Graphics Animations of Talking Faces Based on Stochastic Models," ISSIPNN '94, 1994 International Symposium on Speech, Image Processing and Neural Networks, Proceedings, vol. 1, Apr. 1994, pp. 73-76.
Carter, S. et al., "Improving Video-on Demand Server Efficiency Through Stream Tapping," 1997 IEEE, pp. 200-207.
Carter, S. et al., "Video-on-Demand Broadcasting Protocols," pp. 1-25.
Chen F. et al., "The Use of Emphasis to Automatically Summarize a Spoken Discourse," 1992 IEEE International Conference on Acoustics, Speech and Signal Processing, Mar. 23-26, 1992, pp. I-229 and I-232.
Chen, T. et al, "Lip synchronization in talking head video utilizing speech information," SPIE, Visual Communications and Image Processing '95, vol. 2501, Jul. 1995, pp. 1690-1701.
Covell et al, "Spanning the Gap between Motion Estimation and Morphing," Proceedings of the IEEE International Conference on Acoustics, Speech and Signal Processing, Apr. 19-22, 1994, Adelaide, Australia, http://www.mangolassi.org/covell/1994-010/, 8 pages [Internet Accessed on Jul. 11, 2008].
Virtual Tech, "Thousands of NEW Products are introduced every year by hundreds of companies . . . ," Toyoda Machinery USA, believed to be in use in Japan in 1998, 2 pages.
Flanagan et al., "Computer-steered microphone arrays for sound transduction in large rooms," J. Acoust. Soc. Am. 78 (5), Nov. 1985, pp. 1508-1518.
Forsyth, David et al., "Searching for Digital Pictures," Scientific American, Jun. 1997, pp. 88-93.
Froba, Bernhard et al., "Multi-Sensor Biometric Person Recognition in an Access Control System," Proceedings Second International Conference on Audio- and Video-Based Biometric Person Authentication, Mar. 22-23, 1999, Washington, D.C., pp. 55-59.
Frost III, Otis, "An Algorithm for Linearly Constrained Adaptive Array Processing," Proceedings of the IEEE, vol. 60, No. 8, Aug. 1972, pp. 926-935.
Gemperle, Francine et al., "Design for Wearability," IEEE, 1998, pp. 116-122.
Grenier, Yves, "A microphone array for car environments," Speech Communication, vol. 12, No. 1, Mar. 1993, pp. 25-39.
Haeberli, Paul et al., "Automatic Panoramic Image Merging," World Wide Web, Grafica Obscura, 1998, 2 pages.
Hall, Allan, "A new spin on power dressing," Associated Newspapers Ltd., Sep. 14, 1999, 1 page.
Hauptman et al., "Speech for Multimedia Information Retrieval," UIST '95(ACM), Nov. 14, 1995, pp. 79-80.
Healey, Jennifer et al., "Quantifying Driver Stress: Developing a System for Collecting and Processing Bio-Metric Signals in Natural Situations," Proceedings of the Rocky Mountain Bio-Engineering Symposium, Apr. 16-18, 1999, pp. 1-6.
Healey, Jennifer et al., "StartleCam: A Cybernetic Wearable Camera," Second International Symposium on Wearable Computers, Oct. 19-20, 1998, pp. 42-49.
Henton, C. et al, "Saying and Seeing It With Feeling: Techniques for Synthesizing Visible, Emotional Speech," SSW2-1994, pp. 73-76.
Huttenlocher et al., "Tracking Non-Rigid Objects in Complex Scenes," IEEE International Conference on Computer Vision, 1993, pp. 93-101.
Kelly, Patrick H. et al., "An Architecture for Multiple Perspective Interactive Video" Multimedia 1995, pp. 201-212.
Mann, S. et al., "Video Orbits of the Projective Group: A simple approach to featureless estimation of parameters," IEEE Trans., Image Proc., Jul. 1997, pp. 1-31.
Mann, S. et al., "Virtual Bellows: Constructing High Quality Stills from Video," IEEE, 1994, pp. 363-367.
Moulines et al., "Non-parametric techniques for pitch-scale and time-scale modification of speech," Speech Communication, vol. 16, 1995, pp. 175-205.
Paris et al., "A Low Bandwidth Broadcasting Protocol for Video on Demand," IC3N '98, Oct. 1998, pp. 640-647.
Phillips, P. Jonathon et al., "The FERET Evaluation," Face Recognition: From Theory to Applications, 1998, pp. 244-261.
Product description for SMPTE Time Code Products for GPS Video Position Logging, Horita Co., Inc., Viejo, California, 1998, 1 page.
Product description for Studio Master Time Code and Sync Generators, Horita Co., Inc., Viejo, California, 1998, 1 page.
Rabiner, A Tutorial on Hidden Markov Models and Selected Applications in Speech Recognition, Proceedings of the IEEE, vol. 77, No. 2, Feb. 1989, pp. 257-285.
Rosenberg, Aaron et al., "Recent Research in Automatic Speaker Recognition," Advances in Speech Signal Processing, 1992, pp. 701-738.
Scott et al, "Synthesis of Speaker Facial Movement to Match Selected Speech Sequences," Speech Science and Technology '94, Dec. 5-8, Perth, Australia, 6 pages.
Senior, Andrew, "Face and feature finding for a face recognition system," Proceedings Second International Conference on Audio- and Video-based Biometric Person Authentication, Mar. 22-23, 1999, Washington, D.C., pp. 154-159.
Slaney, M. et al., "Baby Ears: A Recognition System for Affective Vocalizations," Proceeding of the 1998 International Conference on Acoustics, Speech, and Signal Processing (ICASSP), Seattle, WA, May 12-15, 1998, 4 pages.
Sony ClipLink Guide, 1996, pp. 9-14.
Sony PowerHAD digital camcorder operating instructions, 1998, pp. 65-71.
Szeliski, R. et al., "Creating Full View Panoramic Image Mosaics and Environment Maps," Computer Graphics Proceedings, Annual Conference Series, 1997, pp. 251-258.

Szeliski, Richard, "Video Mosaics for Virtual Environments," IEEE Computer Graphics and Application, Mar. 1996, pp. 22-30.

Welsh et al., "Facial-Feature Image Coding Using Principal Components," Electronics Letters, vol. 28, No. 22, Oct. 1992, pp. 2066-2067.

Supercircuits Microvideo Catalog, GC1 Professional Grade Color Covert Glasses Cam, 1998, 1 page.

La Lunette Camera—Alain Mikli, http://www.mikli.fr/eng/Actualites/Lcamera/Lcamera.htm?Nav=1, La Lunette Camera Sunglasses, Jul. 27, 1998, 1 page.

"About Gitzo," http//www.gitzo.com/en/company.htm, Gitzo S.A. Ball Head Camera Mounts, © 1996 and 1997, 4 pages.

"Covert Video/Audio Sunglasses," From Rock House Products, http://www.rock2000.com/nanny/glasses.htm, Dec. 9, 1998, 2 pages.

Velbon.com, "CX Series Photo Tripods," and "DF-Series 'Dual Function' Photo/Video Tripods," 3 pages [Internet accessed on Apr. 13, 1999].

1998 Everest Expedition: Technology, http://www.everest.org/Everest/tech.html, Datacam Technology, Jul. 31, 1998, 2 pages.

Zabih et al., "A Real-Time System for Automatically Annotating Unstructured Image Sequences," IEEE International Conference on Systems, Man, and Cybernetics, 1993, 6 psges.

Final Office Action for U.S. Appl. No. 10/888,800, Mail Date Sep. 29, 2009, 11 pages.

U.S. Appl. No. 12/264,414, filed Nov. 4, 2008, Bhadkamkar et al.

U.S. Appl. No. 12/463,923, filed May 11, 2009, Colter.

Abramson, Nathan Shalom; "Context-Sensitive Multimedia"; Massachusetts Institute of Technology (MIT) Dept. of Architecture; MIT (1993); 106 pages.

Chesnais, Pascal Roger; "A Framework for Designing Constructionist Approaches to Community-Centered Messaging"; Massachusetts Institute of Technology (MIT) Dept. of Architecture; MIT (2000); 143 pages.

Dienes, Klee; Information Architectures for Personalized Multimedia; Massachusetts Institute of Technology (MIT) Dept. of Architecture and Planning; MIT (1995); 41 pages.

Thomson, Elizabeth A.; "Freshman Publishing Experiment Offers Made-to-Order Newspapers"; MIT Tech Talk, vol. 38 No. 25 (1994); Massachusetts Institute of Technology; 3 pages.

Gruhl, Daniel Frederick; "The Search for Meaning in Large Text Databases"; Massachusetts Institute of Technology (MIT) Dept. of Electrical Engineering and Computer Science; MIT (2000); 103 pages.

Haase, K; "FramerD: Representing Knowledge in the Large"; IBM Systems Journal, vol. 35, Nos. 3 & 4 (1996); 17 pages.

Koen, Douglas Branch; "Automated Restructuring of an Electronic Newspaper"; Massachusetts Institute of Technology (MIT) Dept. of Electrical Engineering and Computer Science; MIT (1994); 34 pages.

Richard, Eric; "Freshman Fishwrap Adds International News, Features"; Massachusetts Institute of Technology The Tech Newspaper, vol. 113, No. 59 (Nov. 19, 1993); The Tech (1993); 16 pages.

Schoon, Benjamin Durant; "Fishpaper: Automatic Personalized Newspaper Layout"; Massachusetts Institute of Technology (MIT) Dept. of Electrical Engineering and Computer Science; MIT (1995); 48 pages.

Sheena, Jonathan Ari; "About Time for News"; Massachusetts Institute of Technology (MIT) Dept. of Electrical Engineering and Computer Science; MIT (1996); 44 pages.

Dienes, Klee et al.; "The Design and Evolution of the dtype Hybrid Programming Environment"; Submission to IBM Systems Journal; publication date unknown; 5 pages.

Walter Bender et al., "Network Plus," SPSE Electronic Imaging Devices and Systems Symposium, Jan. 1988.

Makoto Iwayama, "Cluster-Based Text Categorization: A Comparison of Category Search Strategies," SIGIR '95 Proceedings of the 18th annual international ACM SIGIR conference on Research and development in information retrieval; pp. 273-280 (1995).

Pascal R. Chesnais et al., "The Fishwrap Personalized News System," 1995 IEEE International Workshop on Community Networking Integrating Multimedia, pp. 275-282 (1995).

Brij Masand, "Classifying News Stories Using Memory Based Reasoning," SIGIR '92 Proceedings of the 15th Annual International ACM SIGIR Conference on Research and Development in Information Retrieval, pp. 59-65 (1992).

Thorsten Joachims et al., "WebWatcher Machine Learning and Hypertext," Fachgruppentreffen Maschinelles Lernen der Gi-Fachgruppe, University of Dortmund, 5 pages, (1995).

"Wire Service Transmission Guidelines No. 84-2", Special Report: American Newspaper Publishers Association, ANPA Jun. 14, 1984.

"The Associated Press Stylebook and Libel Manual," The Associated Press, 1994.

InfoWorld publication dated Oct. 30, 1989, 3 pages.

InfoWorld publication dated Oct. 24, 1994, 3 pages.

* cited by examiner

BROWSER FOR USE IN NAVIGATING A BODY OF INFORMATION, WITH PARTICULAR APPLICATION TO BROWSING INFORMATION REPRESENTED BY AUDIOVISUAL DATA

CROSS-REFERENCE TO RELATED APPLICATION(S)

This application is a continuation of U.S. patent application Ser. No. 09/866,956 filed May 29, 2001 now abandoned, which is a continuation of U.S. patent application Ser. No. 08/761,030, filed on Dec. 5, 1996 now U.S. Pat. No. 6,263, 507, which applications are incorporated herein in their entirety by reference.

TECHNICAL FIELD

This invention relates to systems and methods that enable observation of a body of information and, in particular, a body of information that can be represented, at least in part, by audiovisual data. Most particularly, the invention relates to systems and methods for accessing and reviewing a body of information represented by one or more sets of audiovisual data that can be used to generate an audiovisual display and one or more related sets of text data that can be used to generate a text display.

BACKGROUND

The increasing complexity of the modern world, and the concomitant explosion in the amount of information available to describe that world, has placed competing demands on people. There is more subject matter that people find necessary or desirable to master or, at least, be familiar with. At the same time, there is less time to spend delving into any particular subject. Too, there is a much larger universe of information from which the desired information must be extracted. Trying to get just an overview of a large body of information can be overwhelming, and attempting to find specific material within the body of information can be like searching for a needle in a haystack.

Thus, there is a continuing and growing need for methods and systems for enabling bodies of information to be accessed and reviewed in a useful manner, e.g., a manner that allows the scope and content of available information to be quickly ascertained and that enables quick access to information of particular interest. In particular, there is a need for systems and methods of organizing, categorizing and relating the various segments of a large body of information to facilitate the access and review of the body of information. For example, while some previous systems for enabling observation of a large body of information enable identification of one or more segments of information that are related to a specified segment of information, these systems do not automatically display such related segments of information. Moreover, the previous systems either require that related segments have previously been determined or, at least, that the segments have been categorized according to subject matter content so that whether two segments are related can readily be determined. Further, previous systems have not enabled determination of relatedness between segments of information represented by different types of data, e.g., such systems cannot determine whether a segment represented by audiovisual data is related to a segment represented by text data.

There is also a need for systems and methods for enabling observation of a body of information that are user-friendly, e.g., that can be used with little training, that are convenient to use, that enable information to be quickly and easily accessed, and that present the information in an accessible format via a high quality display medium. It would also be desirable for such systems and methods to be adapted for use with bodies of information represented by different types of data (i.e., audio data, video data, text data or some combination of the three). It would further be desirable for such systems and methods to be adapted for use with bodies of information represented by data acquired from a wide variety of media (e.g., print media such as newspapers or magazines, television and radio broadcasts, online computer information services and pre-recorded audiovisual programs, to name a few). Previous systems and methods for accessing and reviewing a body of information are deficient in one or more of these respects.

For example, many previous systems are computer-based. Typically, the display device of these systems (e.g., conventional computer display monitor) does not provide a high quality display of time-varying audiovisual information (such as produced by a television, for example). On the other hand, display devices that do display such information well (e.g., televisions), typically do not provide a high quality display of text information (such as produced by a computer display monitor). A system that can provide a high quality display of both types of information is needed.

Additionally, previous systems for reviewing a body of information are not as flexible or convenient to use as is desirable. For example, in many such systems (e.g., computers), the mechanism for controlling the operation of the system is physically coupled to the display device of the system. Therefore, the system can not be operated remotely, thus constraining the user's freedom of movement while operating the system. Additionally, even in those systems where remote operation is possible (e.g., remotely controlled televisions), the remote control device often does not have a user interface that is as readily accessible as desired (as many consumer electronics users can testify, the keypads of many remote control devices are an impenetrable array of cryptic control keys, often requiring non-intuitive key combinations to effect particular control instructions) or the remote control device does not contain a rich set of control features. Moreover, the remote control devices used with previous systems do not have the capability of themselves displaying a part of the body of information.

Further, previous systems often do not enable real-time acquisition and review of some or all of the body of information. For example, many computer-based systems acquire and store data representing a body of information. The stored data can then be accessed to enable display of segments of the body of information. However, insofar as previous systems for observing a body of information allow real-time acquisition and review of the body of information, these systems generally do not analyze the data to enable the data to be organized, categorized and related so that, for example, segments of the body of information can be related to other segments for which data is acquired in the future or for which data has previously been acquired. Moreover, such systems do not enable the real-time display of some or all of a body of information while also displaying related information in response to the real-time display.

Thus, there is a need for improved systems and methods for enabling observation of a body of information and, in particular, such systems and methods that address the above-identified inadequacies in previous systems and methods for enabling observation of a body of information.

SUMMARY

The invention enables a body of information to be displayed by electronic devices (e.g., a television, a computer display monitor) in a manner that allows the body of information to be reviewed quickly and in a flexible manner. Typically, the body of information will be represented by a set of audio data, video data, text data or some combination of the three. In a particular embodiment, the invention enables generation of an audiovisual display of one or more segments of information, as well as a display (a text display, an audio display, a video display, or an audiovisual display), for each of the segments, of one or more related segments of information. In a particular application of the invention, referred to herein as a "news browser", the invention enables acquisition, and subsequent review, of news stories obtained over a specified period of time from a specified group of news sources. For example, as a news browser, the invention can be used to review news stories acquired during one day from several television news programs (e.g., CNN Headline News, NBC Nightly News), as well as from text news sources (e.g., news wire services, traditional print media such as newspapers and magazines, and online news services such as Clarinet™).

The invention enables some or all of a body of information to be skimmed quickly, enabling a quick overview of the content of the body of information to be obtained. The invention also enables quick identification of information that pertains to a particular subject. The invention further enables quick movement from one segment of a body of information to another, so that observation of particular information of interest can be accomplished quickly. In a news browser according to the invention, for example, each of a set of television news programs can be skimmed to quickly ascertain the subject matter content of the news stories contained therein. Additionally, a particular category (e.g., subject matter category) can be specified and news stories having content that fits within the specified subject matter category can be immediately identified and either displayed or identified as pertinent to the subject matter category and available for display. Further, a user of the news browser can move arbitrarily among news stories within the same or different news programs.

The invention also enables automatic identification of information that is related to information that is being displayed, so that the related information can be observed, thereby enabling information about a particular subject to be examined in depth. In particular, the invention enables such identification of related segments to be made between segments of different types (e.g., a segment represented by audiovisual data can be compared to a segment represented by text data to enable a determination of whether the segments are related). A portion or a representation of the related information can be displayed in response to (e.g., simultaneous with) the original information display. For instance, in a news browser according to the invention, one or more text news stories (e.g., news stories that are obtained from traditional print media or from electronic publications) that are related (i.e., which cover the same or similar subject matter) to a television news story being displayed can be automatically identified and a portion of the related text news story or stories displayed so that the story or stories can be reviewed for additional information regarding the subject matter of the television news story. Additionally, in a news browser according to the invention, one or more other television news stories that are related to a television news story being displayed can be automatically identified and a single representative video frame displayed for each such news story.

Additionally, the invention enables automatic categorization of uncategorized segments of the body of information based upon comparison to other segments of the body of information that have been categorized. In particular, the subject matter category of a segment of information can be determined by comparing the segment to one or more previously categorized segments and categorizing the segment in accordance with the subject matter categorization of one or more previously categorized segments that are determined to be relevant to the uncategorized segment. In a news browser according to the invention, for example, this can be used to categorize the news stories of a television news program based upon the categorization of text news stories that are found to be relevant to the television news stories.

The invention can be implemented in a system that is convenient to use, that presents the body of information in a readily accessible way, and that presents the information via one or more display devices that are tailored for use with the particular type of data that is used to generate the display. For example, a system according to the invention can include a control device that enables remote, untethered control of a primary display device of the system. The remote control device can also be implemented so that some or all of the body of information can also be displayed on the remote control device. The system can include, for example, a television for display of audiovisual information and a computer display monitor for display of text information.

Additionally, a control device of a system according to the invention can be implemented with a graphical user interface that facilitates user interaction with the system. For example, such an interface can include a region that provides an indication of a user's past progression through, and present location within, the body of information. In a news browser according to the invention, for example, a program map is displayed that facilitates navigation through the news programs that can be selected for display.

The invention also enables real-time acquisition and review of some or all of the body of information. The invention enables on-the-fly analysis of data as the data is acquired, so that the data can be organized, categorized and related to other data. The invention also enables the real-time display of some or all of a body of information while also displaying related information in response to the real-time display. For example, in a news browser according to the invention, television news programs can be acquired and displayed as they occur. Related news stories, either from previously acquired television news programs or text news sources can be displayed as each television news story is displayed in real time.

The invention also enables control of the manner in which the information is displayed (e.g., the apparent display rate of the, display can be controlled, the display can be paused, a summary of a portion of the body of information can be displayed). For example, in a news browser according to the invention, the user can cause a summary of one or more television news stories to be displayed (rather than the entire news story or stories), the user can speed up (or slow down) the display of a television news story, and the user can pause and resume the display of a television news story such that the display resumes at an accelerated rate until the display of the news story "catches up" to where the display would have been without the pause (a useful feature when the television news story is being acquired and displayed in real time).

In one aspect of the invention, a system enables acquisition and review of a body of information that includes a multiplicity of segments that each represent a defined set of information (frequently, a contiguous related set of information) in the body of information. The system includes: i) a mechanism for acquiring data representing the body of information; ii) a mechanism for storing the data; iii) a first display mechanism for generating a display of a first segment of the body of information from data that is part of the stored data; iv) a mechanism for comparing the data representing a segment of the body of information to the data representing a different segment of the body of information to determine whether, according to one or more predetermined criteria, the compared segments are related; and v) a second display mechanism for generating a display of a portion of, or a representation of, a second segment of the body of information from data that is part of the stored data. (A method according to the invention, and a computer readable medium encoded with one or more computer programs according to the invention, both enable similar capability.) The second display mechanism displays a portion or representation of the second segment in response to the display by the first display mechanism of a first segment to which the second segment is related. The second display mechanism can display a portion or representation of the second segment substantially coextensive in time with the display of the related first segment by the first display mechanism. The system can further include a mechanism for identifying the subject matter content of a segment of the body of information, so that the mechanism for comparing can determine the similarity of the subject matter content of a segment to the subject matter content of a different segment (using, for example, relevance feedback) and use that result to determine the relatedness of the compared segments. The system can also include a mechanism for identifying an instruction from a user to begin displaying at least some of the body of information, the first display mechanism beginning display of a segment in response to the user instruction. When a portion or representation of a second segment is being displayed, the system can enable such a second segment to be selected for display by the first display mechanism. Often, the segments displayed by the first display mechanism are represented by audiovisual data (and, in particular, audiovisual data that can be used to generate an audiovisual display that can vary with time), such as, for example, data produced from television or radio broadcast signals. The segments displayed by the second display mechanism can be represented by audiovisual data (e.g., a single representative video image, or "keyframe") or by text data (e.g., text excerpts), such as, for example, data from computer-readable data files acquired over a computer network from an information providing site that is part of that network. In particular applications for which use of the invention is contemplated, the first display mechanism can be an analog display device (such as a television) and the second display means can be a digital display device (such as a computer display monitor). The system can advantageously be implemented so that the various devices are interconnected to a conventional computer bus that enables the devices to communicate with each other such that the devices do not require wire communication over network communication lines to communicate with each other (the devices are "untethered").

In another aspect of the invention, a system for reviewing a body of audiovisual information that can vary with time (e.g., the content from one or more news broadcasts) includes: i) a mechanism for displaying the audiovisual information; and ii) a mechanism for controlling operation of the system, the mechanism for controlling being physically separate from the mechanism for displaying and including a graphical user interface for enabling specification of control instructions. The mechanism for controlling can advantageously be made portable. Further, the system can advantageously include a mechanism for 2-way wireless communication between the mechanism for displaying and the mechanism for controlling. The graphical user interface can include one or more of the following: i) a playback control region for enabling specification of control instructions that control the manner in which the audiovisual information is displayed on the means for displaying; ii) a map region for providing a description of the subject matter content of the audiovisual information and for enabling specification of control instructions that enable navigation within the audiovisual information; iii) a related information region for displaying a portion of, or a representation of, a segment that is related to a segment being displayed by the mechanism for displaying; and iv) a secondary information display region for displaying a secondary information segment that is related to a segment of the audiovisual information that is being displayed by the mechanism for displaying. In particular, the playback control region can include one or more of the following: i) an interface that enables selection of one of a plurality of subject matter categories, all of the segments of the audiovisual information corresponding to a particular subject matter category being displayed in response to the selection of that subject matter category; ii) an interface that enables variation of the apparent display rate at which the audiovisual information is displayed; iii) an interface that enables specification of the display of a summary of a segment of the audiovisual information; iv) an interface that enables the display to be paused, then resumed at an accelerated rate that continues until the display of the audiovisual information coincides with the display that would have appeared had the display not been paused; v) an interface that enables termination of the current segment display and beginning of a new segment display; and vi) an interface that enables repetition of the current segment display. The map region can further identify a segment of the audiovisual information that is currently being displayed and/or identify each segment of the audiovisual information that has previously been displayed.

In still another aspect of the invention, a system enables review of a body of information, the body of information including a first portion that is represented by audiovisual data that can vary with time and a second portion that is represented by text data. The system includes a first display device for displaying the first portion of information and a second display device for displaying the second portion of information. The first display device is particularly adapted for generation of a display from time-varying audiovisual data, while the second display device is particularly adapted for generation of a display from text data. The first display device can be, for example, an analog display device such as a television. The second display device can be, for example, a digital display device such as a computer display monitor. The two devices can interact with each other so that related information can be displayed at the same time on the two devices, in the same manner as that described above.

In another aspect of the invention, a method categorizes according to subject matter a segment of a body of information (that includes a plurality of segments), the segment not previously having been categorized according to subject matter, based upon the subject matter category or categories associated with one or more previously categorized segments of the body of information. The uncategorized segment can have been acquired from a first data source (that supplies, for example, television or radio broadcast signals) and the previously categorized segment or segments can have been acquired from a second data source (that supplies, for example, computer-readable data files) that is different than the first data source. The method includes the steps of: i) determining the degree of similarity between the subject matter content of the uncategorized segment and the subject matter content of each of the previously categorized segments; ii) identifying one or more of the previously categorized segments as relevant to the uncategorized segment based upon the determined degrees of similarity of subject matter content between the uncategorized segment and the previously categorized segments; and iii) selecting one or more subject matter categories with which to identify the uncategorized segment based upon the subject matter category or categories used to identify the relevant previously categorized segment or segments. (A computer readable medium encoded with one or more computer programs according to the invention enables similar capability.) The step of determining the degree of similarity can be accomplished using a relevance feedback method. The step of identifying one or more of the previously categorized segments as relevant to the uncategorized segment can include the steps of: i) identifying a multiplicity of the previously categorized segments that are the most similar to the uncategorized segment; ii) determining the degree of similarity between each of the multiplicity of previously categorized segments and each other of the plurality of previously categorized segments; iii) for each pair of previously categorized segments of the multiplicity of previously categorized segments having greater than a predefined degree of similarity, eliminating one of the pair of previously categorized segments from the multiplicity of previously categorized segments, wherein the previously categorized segment or segments remaining after the step of eliminating are similar and distinct previously categorized segments; and iv) identifying one or more of the similar and distinct previously categorized segments as relevant previously categorized segments.

In another aspect of the invention, a method determines whether a first set of information represented by a set of data of a first type (e.g., text data) is relevant to a second set of information (that is different than the first set of information) represented by a set of data of a second type (e.g., audiovisual data). The method includes the steps of: i) deriving a set of data of the second type from the set of data of the first type, the derived set of data of the second type also being representative of the first set of information; ii) determining the degree of similarity between the set of data of the second type representing the second set of information and the derived set of data of the second type representing the first set of information; and iii) determining whether the first set of information is relevant to the second set of information based upon the degree of similarity between the set of data of the second type representing the second set of information and the derived set of data of the second type representing the first set of information. (A computer readable medium encoded with one or more computer programs according to the invention enables similar capability.) The step of determining the degree of similarity can be accomplished using a relevance feedback method. Still further in accordance with this aspect of the invention, a method can determine which, if any, of a multiplicity of sets of information represented by an associated set of data of a first type (each of the multiplicity of sets of information being different from other of the multiplicity of sets of information) are relevant to the second set of information represented by the set of data of the second type. This method includes the steps of, in addition to those discussed above: i) determining the degree of similarity between each set of data of the first type representing one of the multiplicity of sets of information and the derived set of data of the first type representing the second set of information; ii) identifying which, if any, of the sets of data of the first type representing one of the multiplicity of sets of information have greater than a predefined degree of similarity to the derived set of data of the first type representing the second set of information, the sets of data of the first type so identified being termed similar sets of data of the first type; iii) determining the degree of similarity between each similar set of data of the first type and each other similar set of data of the first type; iv) for each pair of similar sets of data of the first type having greater than a predefined degree of similarity, eliminating one of the pair of similar sets of data of the first type from the set of similar-sets of data of the first type, wherein the set or sets of similar data of the first type remaining after the step of eliminating are similar and distinct sets of data of the first type; and v) identifying the set or sets of information corresponding to one or more of the similar and distinct sets of data of the first type as relevant to the second set of information.

In still another aspect of the invention, a method enables the identification of the boundaries of segments in a body of information that is represented by a set of text data and at least one of a set of audio data or a set of video data, each segment representing a contiguous related set of information in the body of information. (A computer readable medium encoded with one or more computer programs according to the invention enables similar capability.) The segment boundaries are identified by first performing a coarse partitioning method to approximately locate the segment boundaries, then performing a fine partitioning method to more precisely locate the segment boundaries. In the coarse partitioning method, time-stamped markers in the set of text data are identified and used to determine approximate segment boundaries within the body of information. For each time of occurrence of an approximate segment boundary in the text data, a range of time is specified that includes the time of occurrence. Subsets of audio data or subsets of video data that occur during the specified ranges of time are extracted from the complete set of audio data or the complete set of video data. The fine partitioning method is then performed to identify one or more breaks in each of the subsets of audio data or each of the subsets of video data. The best break that occurs in each subset of audio data or each subset of video data is selected, and the time of occurrence of the best break in each subset is designated as a boundary of a segment in the body of information. The fine partitioning can be performed using any appropriate method. For example, when segment boundaries are being determined in video data, scene break identification can be used to implement the fine partitioning. When segment boundaries are being determined in audio data, the fine partitioning can be implemented by, for example, pause recognition, voice recognition, word recognition or music recognition. Once segment boundaries have been determined in the audio data or the video data, a synchronization of the audio data and the video data can be used to determine the boundaries of the segment in the other of the audio data or video data.

DETAILED DESCRIPTION

I. Overview

Figure 1:
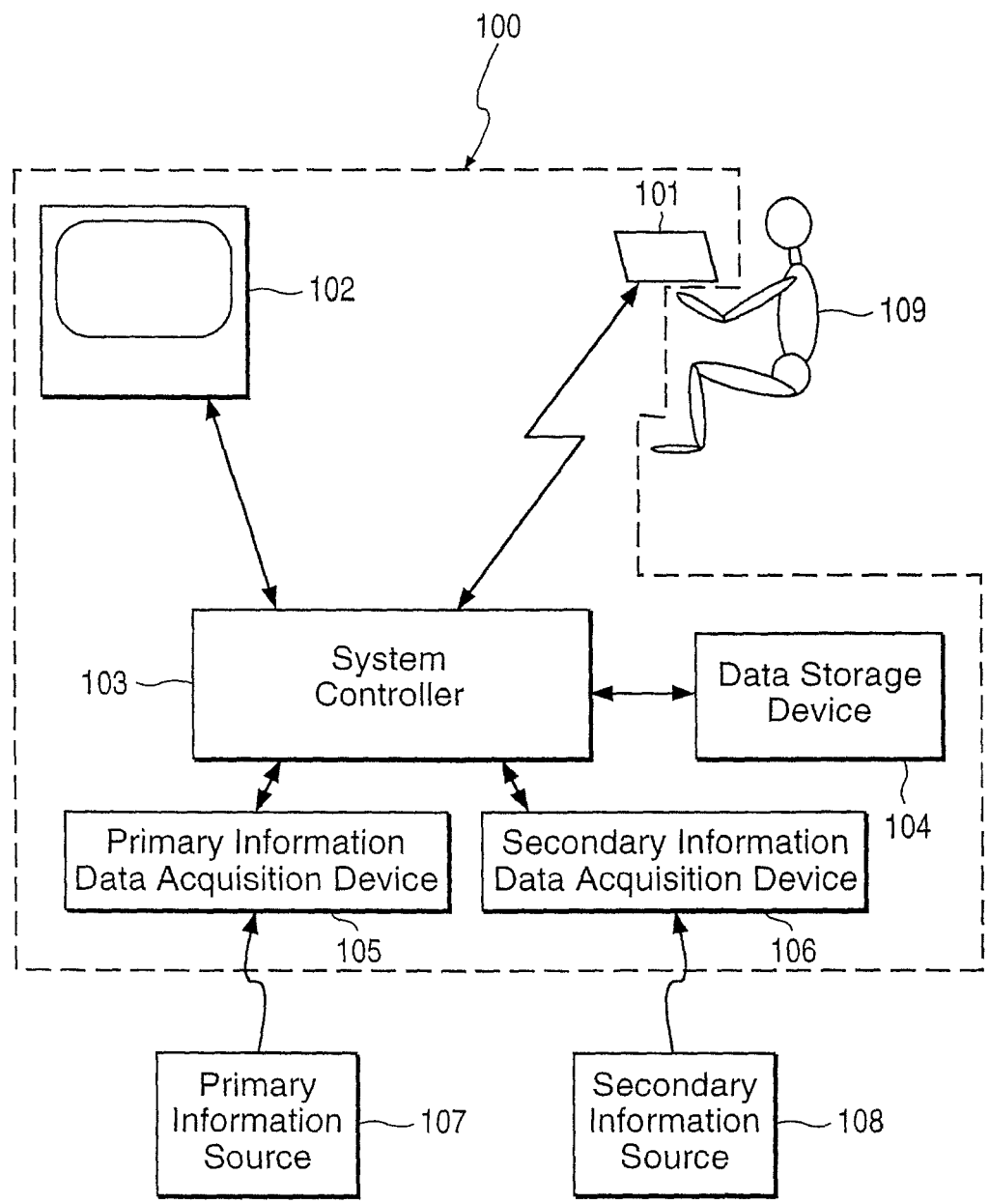
FIG. 1 is a block diagram illustrating a system according to the invention for acquiring and reviewing a body of information.

Generally, the invention enables the acquisition of a body of information and review of the content of the body of information. In particular, the invention includes various features that facilitate and enhance review of the body of information. The invention enables the body of information to be quickly reviewed to obtain an overview of the content of the body of information or some portion of the body information. The invention also allows flexibility in the manner in which the body of information is reviewed. For example, the invention enables a user to move quickly from one segment of a body of information to another, enabling the user to rapidly begin observing particular information of interest. Further, the invention enables a user to quickly locate information within the body of information that pertains to a particular subject in which the user has an interest. The invention also enables a user to, when observing particular information, quickly find and review other information that is related to the information that the user is observing. Additionally, the invention enables the user to control the manner in which the information is displayed (e.g., the apparent display rate of the display can be controlled, the display can be paused, a summary of a portion of the body of information can be displayed). The invention also provides the user with an indication of the user's past progression through, and present location within, the body of information, such indications aiding the user in selecting further segments (described below) of the body of information for review.

The body of information can be represented by one or more sets of audio data, one or more sets of video data, one or more sets of text data or some combination of the three. Herein, "audio data" refers to data used to generate an audio display, "video data" refers to data used to generate a video display substantially including images other than text images, "text data" refers to data used to generate a video (or audio, though typically video) display of text images, and "audiovisual data" refers to data that includes audio and/or video data, and may include text data. In a particular embodiment, the invention enables the acquisition and review of one or more sets of information represented by audiovisual data, as well as related sets of information represented by text data.

For example, in a particular application of the invention, the content of one or more audiovisual news programs is acquired from a first set of one or more information sources and news stories (or "articles") from text news sources are acquired from a second set of one or more information sources. The first set of information sources could be, for example, CNN Headline News or network (e.g., ABC, NBC, CBS) news programs. The second set of information sources could be, for example, on-line news services such as Clarinet™ or news wire services such as AP or UPI. It is contemplated that this application of the invention can be particularly useful as a means of enhancing the viewing of conventional television news programs. For example, in this application, the invention can enable the user to access the news stories of audiovisual news programs in a random manner so that the user can move quickly from one news program to another, or from one news story in a news program to another news story in the same or another news program. The invention can also enable the user to quickly locate news stories pertaining to a particular subject. Additionally, when the user is observing a particular news story in an audiovisual news program, the invention can identify and display a related text news story or stories. The invention can also enable the user to control the display of the audiovisual news programs by, for example, speeding up the display, causing a summary of one or more news stories to be displayed, or pausing the display of the news stories, thereby enabling the user to quickly ascertain the content of one or more news stories or entire news programs. Additionally, the invention can indicate to the user which audiovisual news program is currently being viewed (and, further, which news story within the news program is being viewed), as well as which news stories and/or news programs have previously been viewed.

II. System Configuration

FIG. 1 is a block diagram illustrating a system 100 according to the invention for acquiring and reviewing a body of information. A user 109 interacts with a control device 101 to cause information to be displayed on a primary display device 102. The control device 101 includes an appropriate user interface (e.g., a graphical user interface, as discussed in more detail below) that allows the user 109 to specify control instructions for effecting control of the system 100. Communication between the control device 101 and the primary display device 102 is mediated by a system controller 103. The system controller 103 causes primary information to be acquired from a primary information source 107 via a primary information data acquisition device 105. Herein, "primary information" is any information the display of which the user can directly control. The system controller 103 also causes secondary information (which is typically related to the primary information) to be acquired from a secondary information source 108 via a secondary information data acquisition device 106. Herein, "secondary information" is any information other than primary information that is acquired by a system according to the invention and that can be displayed by the system and/or used by the system to manipulate or categorize (as described in more detail below) the primary information. A data storage device 104 stores the acquired primary and secondary information. The primary information is displayed on the primary display device 102. The secondary information can be displayed (e.g., by the control device 101 or by the primary display device 102 in addition to the primary information) or not (i.e., the secondary information may be used only for categorizing and/or manipulation of the primary information). Illustratively, the primary information can be videotape (or other audiovisual data representation) of an audiovisual news program or programs and the secondary information can be the text of news stories from text news sources.

The control device 101, the primary display device 102, the system controller 103 and the data storage device 104 can be embodied in one or more devices that can be interconnected to a conventional computer bus that enables the devices to communicate with each other. In particular, the devices 101, 102, 103 and 104 can be integrated into a system in which the devices do not require wire communication over network communication lines to communicate with each other (one or more of the devices 101, 102, 103 and 104 is "untethered" with respect to one or more of the other devices 101, 102, 103 and 104). Thus, once the primary and secondary information have been acquired by the system 100, the primary and secondary information can be accessed and displayed at a relatively fast speed, thus providing quick response to control instructions from the user and enabling generation of displays with acceptable fidelity. In contrast, a networked system in which the devices must communicate with each other over a network via wire communication lines—in particular, a system in which the control device and display device or devices must communicate over such wire communication lines with the data storage device on which the information is stored— may not produce acceptable performance. In the networked system, the operation of the system is limited by the communications bandwidth and latency of the network communications medium. For example, the bandwidth of the network communications medium may not be adequate to enable transfer of data from the data storage device 104 to the primary display device 102 quickly enough to enable a display with acceptable fidelity to be generated by the primary display device 102. Or, the response to a control instruction from the control device 101 may be undesirably slow because of inadequate speed of the network communications medium.

The primary information data acquisition device 105 and secondary information data acquisition device 106 can be implemented by any appropriate such devices. Where the primary information source 107 is comprised of television news broadcasts, for example, the primary information data acquisition device 105 can be a conventional television tuner and video capture device that acquires the data representing the primary information via conventional cable connections, satellite dish or television antenna. Where the secondary information is comprised of online text sources (i.e., text sources available over a computer network such as the Internet), for example, the secondary information data acquisition device 106 can be a conventional modem or other communications adapter, as known by those skilled in the art of data communications, that enables acquisition of data representing the secondary information via one or more conventional communication lines, such as telephone lines, ISDN lines or Ethernet connections. (It is also possible that the primary information can be acquired from online sources, such as via the Internet or other computer network.)

The primary information data acquisition device 105 and the secondary information data acquisition device 106 can communicate with the system controller 103 in any appropriate manner. As described below, the system controller 103 can be implemented as part of a digital computer. Where this is the case, the communication between the system controller 103 and the devices 105 and 106 is preferably implemented to enable computer control of the devices 105 and 106. When the device 105 or 106 is used to acquire information over a computer network, the device 105 or 106 will be a device, such as a computer modem, for which such communication to the system controller 103 can be implemented using well-known methods and apparatus. For other types of devices, such communication must be implemented in another manner. For example, when the device 105 is a television tuner, communication between the system controller 103 and the device 105 can be implemented using a VISCA (Video System Control Architecture) connection.

As will be apparent from the description below, the processing of the data representing the primary and secondary information generally requires that the data be in digital form. Text data acquired from online text sources, for example, is acquired in digital form and so can be used directly in such processing. Analog television signals, however, must be digitized before being used in digital processing. This can be accomplished using conventional A/D conversion methods and apparatus. Further, it is desirable to compress the data to increase the amount of data (i.e., primary and secondary information) that can be stored on the data storage device 104. For example, the television data can be compressed according to the MPEG, JPEG or MJPEG video compression standards, as known by those skilled in the art of audio and video data compression. The text data can also be compressed, using conventional text file compression programs, such as PKZIP, though, typically, such compression provides a relatively small benefit because the amount of text data is small compared to the amount of audio and video data, and the amount of data required to represent the categorization information (described below). Finally, it may be desirable or necessary to transform digital data into an analog waveform again (e.g., convert digital video data into analog video data for display by a television). This can be accomplished using conventional D/A conversion methods and apparatus.

In the embodiment of the invention shown in FIG. 1, the system 100 according to the invention makes use of two devices for display and control: a primary display device 102 for displaying the primary information and a control device 101 for controlling the operation of the primary display device 102. Preferably, the control device 101 is physically separate from the primary display device 102 and portable so that the user has flexibility in selecting a position relative to the primary display device 102 during use of the system 100. For example, such an embodiment could allow a user to use the invention while sitting in a chair or on a couch, reclining in bed, or sitting at a table or desk. Additionally, when the secondary information is textual (e.g., the text of news stories) and the control device 101 is used to display such secondary information, the portability of the control device 101 attendant such an embodiment increases the likelihood that the text is displayed on a device that can be held in close proximity to the user, thereby improving the ability of the user to view the text. Further, as discussed in greater detail below, the control device 101 preferably has sophisticated user interface capabilities.

As previously mentioned, a system according to the invention (including the system 100) can be implemented so that the primary display device 102 displays the primary information while a separate device (e.g., the control device 101) displays the secondary information. Further, as can be appreciated from the description herein, the invention can advantageously be used in situations in which the primary information is audiovisual information (and, in particular, audiovisual information that can vary with time, such as the content of a television program) and the secondary information is text information (some or all of which is, typically, likely to be related to the audiovisual information). In such an implementation of the invention, the use of two different devices for display allows the optimization of the display devices for the particular type of information to be displayed. (A system according to the invention can, in general, have any number of displays, as necessary or advantageous.) Thus, where the primary information is audiovisual information, the primary display device 102 is preferably a device that enables high quality audio and video images (in particular, time-varying audio and video images) to be produced, such as a television. However, while a television is good for displaying audiovisual information, the television doesn't do as good a job with the display of text, particularly at typical viewing distances. A computer display monitor, on the other hand, does a good job of displaying text. Thus, a computer display monitor can be used to display the secondary information. (Herein, a "computer display monitor" can display not only video, but also audio.) In particular, a portable computer (e.g., a notebook or subnotebook computer) can advantageously be used to implement such display. Moreover, the portable computer can also be used to implement the control device 101, thus allowing the display of the secondary information to be integrated with the user interface used to specify instructions for controlling operation of the system 100. Where a portable computer is used to implement the control device 101, communication between the control device 101 and the rest of the system 100 is advantageously accomplished using a wireless local area network (LAN), infrared link, or other wireless communications system, so that the user will have more freedom of movement when using the control device 101.

The system controller 103 can be implemented by any conventional processing device or devices that can accomplish the functions of a system controller as described herein. For example, the system controller 103 can be implemented by a conventional microprocessor chip, as well as peripheral and other computer chips that can be configured to perform the functions of the system controller 103. The data storage device 104 can be implemented by any conventional storage devices. The data storage device 104 can be implemented, for example, by a conventional computer hard disk (to enable storage of digital data, including analog data—e.g., television or radio signals—that has been digitized), a conventional videotape (to enable storage of, for example, analog data corresponding to acquired television signals) or a conventional audiotape (to enable storage of, for example, analog data corresponding to acquired radio signals). In particular, the system controller 103 and data storage device 104 can be implemented, for example, in a conventional digital computer. The devices with which the system controller 103 and data storage device 104 are implemented should have the capability to compress and decompress the audio, video and text data quickly enough to enable real-time display of that data. The system controller 103 can communicate with the control device 101 and the primary display device 102 in any appropriate manner, including wire and wireless communications.

In a particular embodiment of the invention, the control device 101 can be embodied by a portable computer (e.g., a Thinkpad™ computer, made by IBM Corp. of Armonk, N.Y.). The portable computer and associated display screen facilitate the presentation of a graphical user interface, as will be apparent from the description below. Preferably, the portable computer has a color display screen. A color display screen further facilitates implementation of a graphical user interface by enabling color differentiation to be used to enhance the features provided in the graphical user interface. The Thinkpad™ can be configured (as known by those skilled in such art) to act as an X/windows terminal (client) that communicates with an X/windows host (server), using standard X/windows protocols (as also known by those skilled in such art), to enable generation and display of the graphical user interface. In this particular embodiment of the invention, the primary display device 102, as well as the system controller (X/windows host) 103, can be embodied, for example, by an Indigo2 workstation computer made by Silicon Graphics Incorporated (SGI) of Mountain View, Calif. The portable computer can communicate with the SGI Indigo2 computer via a wireless Ethernet link.

Alternatively, both of the primary display device 102 and control device 101 could be implemented in a digital computer with the system controller 103 and data storage device 104 (although such an implementation may not have some of the advantages of the embodiments of the invention described above). For example, the above-mentioned SGI Indigo2 computer or an IBM-compatible desktop computer could be used to implement a system of the invention in this manner. In particular, implementation of a system according to the invention in this manner could advantageously be accomplished on a portable computer such as a notebook computer.

III. User Interface

A. Graphical User Interface

1. Overview

Figure 2A:
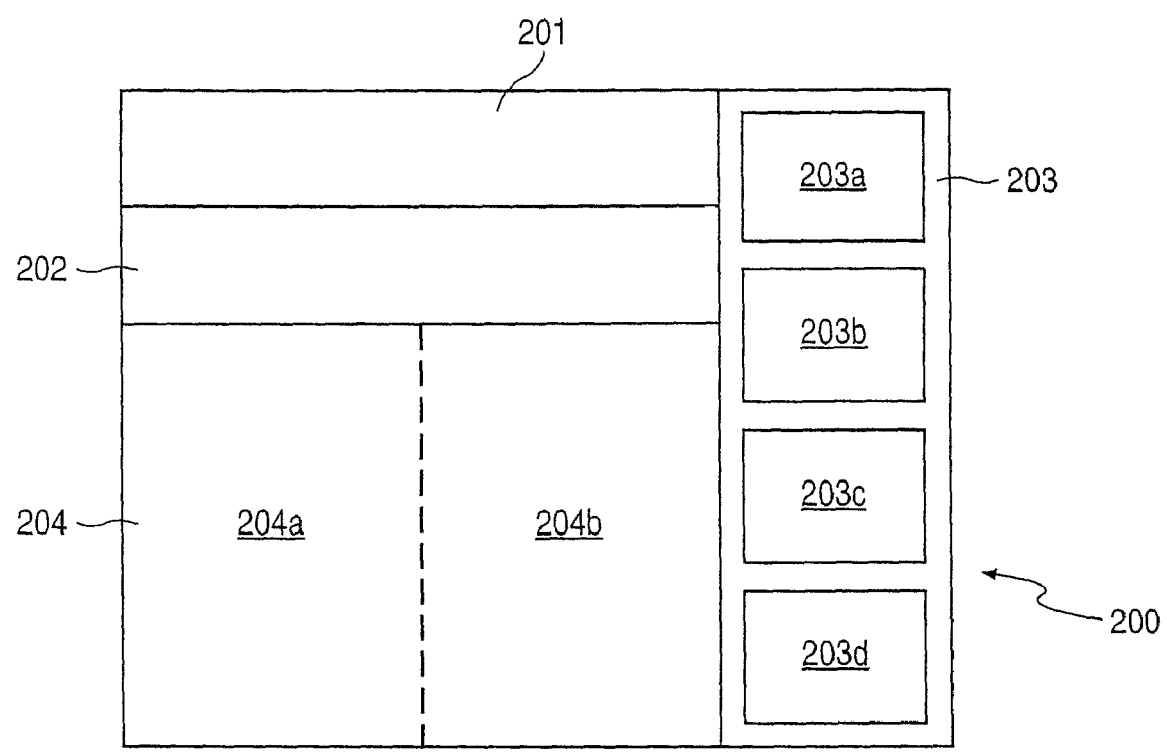
FIG. 2A is a diagrammatic representation of a graphical user interface according to the invention that can be used to enable control of the operation of a system according to the invention, display information regarding operation of the system of the invention and display information acquired by the system of the invention.

FIG. 2A is a diagrammatic representation of a graphical user interface (GUI) 200 according to the invention that can be used to enable control of the operation of a system according to the invention, display information regarding operation of the system of the invention and display information acquired by the system of the invention. Generally, a GUI according to the invention can be displayed using any suitable display device. Further, when a GUI according to the invention is displayed on a display monitor of a digital computer, the GUI can be implemented by appropriately tailoring conventional computer display software, as known to those skilled in the art in view of the discussion below. For example, the GUI 200 can be displayed on the screen of a portable computer.

The GUI 200 includes four regions: primary information playback control region 201, primary information map region 202, related primary information region 203, and related secondary information region 204. It is to be understood that the regions 201, 202, 203 and 204 could be arranged in a different manner, have different shapes and/or occupy a greater or lesser portion of the GUI 200 than shown in FIG. 2A. Additionally, it is to be understood that a GUI according to the invention need not include all or any of the regions 201, 202, 203 or 204; it is only necessary that the GUI include features that allow the system according to the invention to be controlled. Thus, for example, a GUI according to the invention could function adequately without a related primary information region 203. The GUI also need not, for example, include a primary information map region 202 or a primary information playback control region 201 having exactly the characteristics described below; other interfaces enabling similar functionality could also be used. The GUI could also be implemented so that user interaction with standard GUI mechanisms such as menus and dialog boxes is necessary to cause display of system controls, system operation information, and/or acquired information. For example, a GUI according to the invention could be implemented such that a display of the related secondary information region 204 is produced only upon appropriate interaction with one or more menus and/or dialog boxes.

Figure 2B:
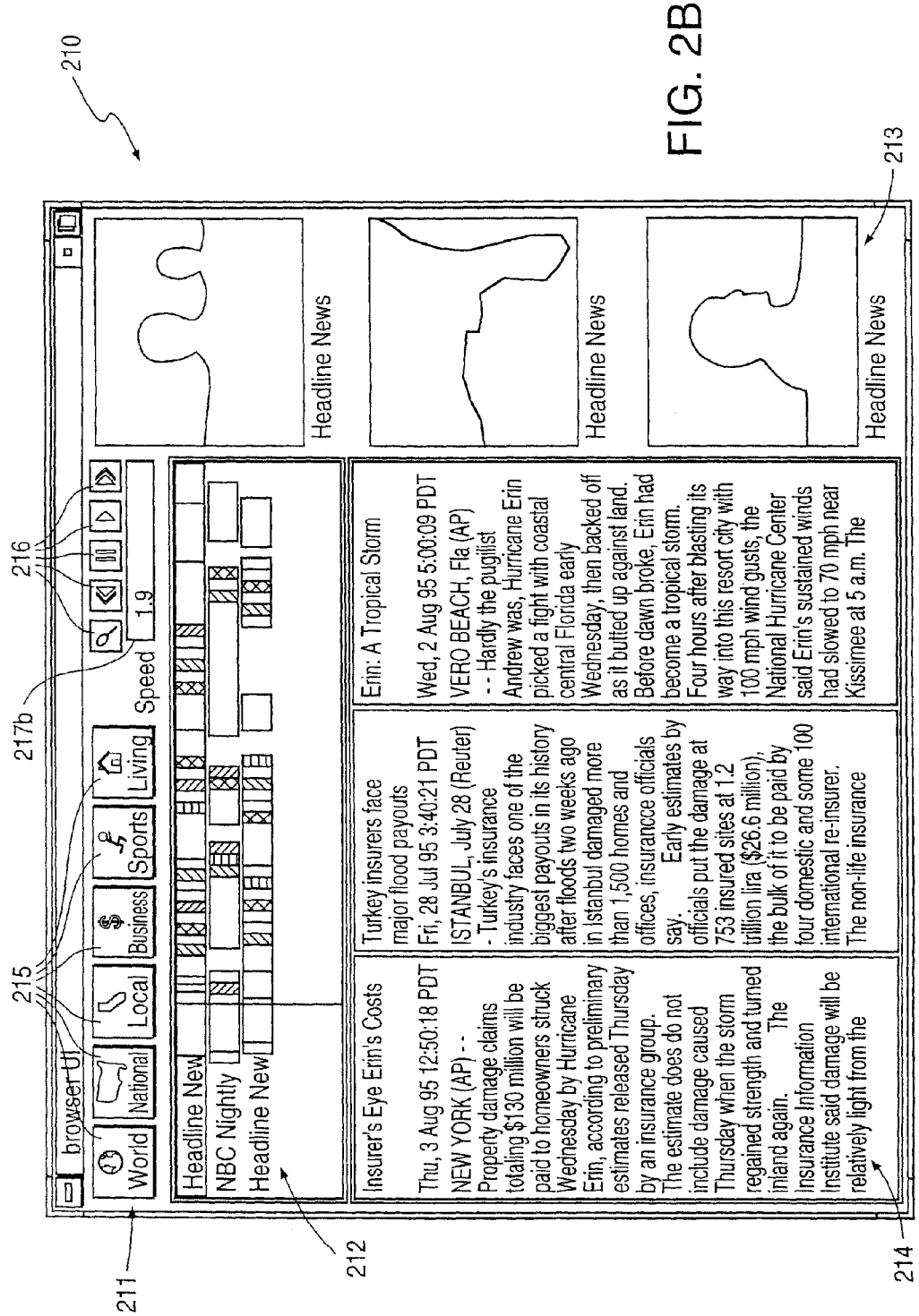
FIG. 2B is a view of an illustrative graphical user interface in accordance with the diagrammatic representation of FIG. 2A.

FIG. 2B is a view of an illustrative GUI 210 in accordance with the diagrammatic representation of FIG. 2A. The GUI 210 is particularly tailored for use with an embodiment of the invention in which the primary information includes videotape of one or more news programs and the secondary information includes the text of news stories from text news sources. Below, the regions 201, 202, 203 and 204 of the generic GUI 200 are described generally, while the corresponding regions 211, 212, 213 and 214 of the particular GUI 210 are described in detail.

2. Control of Primary Information Display

The primary information playback control region 201 of the GUI 200 is used to control the manner in which the primary information is displayed on the primary display device 102. The region 201 can be used, for example, to provide a mechanism to enable the user to begin, stop or pause display of the primary information, as well as rewind or fast forward the display. The region 201 can also be used, for example, to control the particular primary information that is displayed, as well as the apparent display rate at which the primary information is displayed.

As seen in FIG. 2B, the primary information playback control region 211 of the GUI 210 includes topic "buttons" 215, control "buttons" 216 and a speed control 217. It is to be understood that the functionality of the topic buttons 215, control buttons 216 and speed control 217, described below, could be accomplished in a manner other than that shown in FIG. 2B and described below.

The topic buttons 215 enable the user to select a subject matter category so that, for example, all news stories in the recorded news programs that pertain to the selected subject matter category are displayed one after the other by the primary display device 102. Alternatively, selection of a topic button 215 could cause a list of news stories pertaining to that subject matter category to appear, from which list the user could select one or more news stories for viewing. (The categorization of the primary information by subject matter category is discussed in more detail below.) The GUI 210 includes six topic buttons 215 to enable selection of news stories related to international news ("World"), national news ("National"), regional news ("Local"), business news ("Business"), sports news ("Sports"), and human interest news ("Living"); however, a GUI according to the invention can include any number of topic buttons and each button can correspond to any desired subject matter category designation.

The control buttons 216 enable the user to control which news story is displayed, as well as the manner in which a news story is displayed. Moving from left to right in FIG. 2B, the control buttons 216 respectively cause the display to activate a dialog box that enables the user to perform a keyword search of the text of news stories acquired by the system of the invention, return to the beginning of the currently displayed story to begin displaying the story again, stop the display, start the display, and skip ahead to the next story in a predetermined sequence of stories. A GUI according to the invention can include other control buttons that enable performance of other functions instead of, or in addition to, the functions enabled by the control buttons 216, such as fast forwarding the display, rewinding the display, pausing the display (a particular method according to the invention is described below), and displaying a summarized version of the primary information (a particular method according to the invention is described in more detail below).

The speed control 217 can be used to increase or decrease the apparent display rate with which the primary information is displayed. The speed control display 217 shows a number that represents the amount by which a normal display rate is multiplied to produce the current apparent display rate, and includes a graphical slider bar that can be used to adjust the apparent display rate. The manner in which the apparent display rate can be changed is described in more detail below.

3. Map of Primary Information Display

The primary information map region 202 of the GUI 200 provides the user with a description of the content of the primary information that is available for display, as well as information that facilitates navigation through the primary information, and can also be used to allow the user to select particular primary information for display. The description of the primary information can include, for example, an illustration or other description of the subdivision of the primary information into smaller portions (e.g., segments) of information. Such illustration or description can convey the number of portions, the length (i.e., time duration) of each portion and the subject matter of each portion. The region 202 can also be used to show the user the location within the primary information of the portion of the primary information that is currently being viewed, as well as which (if any) portions of the primary information have previously been viewed. Additionally, the region 202 can be used to enable the user to move freely among portions of the primary information by, for example, using a conventional mouse to point and click on a portion of the primary information that is illustrated in the region 202.

As seen in FIG. 2B, the primary information map region 212 of the GUI 210 includes several subdivided rows, each row representing a particular news program (e.g., CNN Headline News, NBC Nightly News, etc.). Each row is a map that illustrates to some level of detail the content of the corresponding news program. Each of the subdivisions of a row represent breaks during the news program, such as breaks between news stories. The region between each subdivision represents a news story (a region could also represent, for example, an advertisement). The duration of each news story is depicted graphically by the length of the region corresponding to that news story. Each region in a row can be displayed in a particular color, each color representing a particular predetermined subject matter category (i.e., topic), so that the color of each region denotes the subject matter category of the news story corresponding to that region.

The map region 212 can be further enhanced in any of a variety of ways. For example, the news program (row) that is currently being viewed can be marked, such as by, for example, shading the row of the currently viewed news program a particular color or causing a particular type of symbol to appear adjacent to the row of the currently viewed news program. Additionally, news stories that have already been viewed can be marked in an appropriate manner, such as by, for example, causing the regions of the viewed news stories to be cross-hatched or to be shaded a particular color. The current viewing location can also be shown: in FIG. 2B, this is shown by a vertical line.

4. Related Primary Information

The related primary information region 203 of the GUI 200 displays "thumbnails" which identify segments of the primary information that are related to the primary information that is currently being displayed. Though the region 203 includes four thumbnails 203a, 203b, 203c, 203d, generally, the region 203 can be used to display any number of thumbnails. Further, the thumbnails can take any form, such as a display of a portion of the segment or a display of a representation of the segment. For example, the thumbnails 203a, 203b, 203c, 203d can be single video images that represent the video data of the segment being identified ("keyframes"). (As seen in FIG. 2B, the related primary information region 213 of the GUI 210 includes three single video images that each represent a news story from a news program.) Alternatively, the thumbnails 203a, 203b, 203c, 203d could be a text summary or other text identifier of the segment being identified. Or, the thumbnails 203a, 203b, 203c, 203d could be pictorial representations that identify the corresponding segment. Other possibilities exist, as known to those skilled in the art.

To enable display of thumbnails, primary information segments that are related to the primary information segment that is being displayed must be determined. A threshold of relatedness (the expression of the threshold depending upon the method used to determine relatedness) is preferably specified so that only segments that are sufficiently related to the displayed segment are displayed in the related primary information region 203, even if that means that less than the allotted number of segments (including no segments) are displayed. If appropriate, redundant segments can be eliminated from the primary information segments to be displayed in the related primary information region 203, using techniques similar to those described below for eliminating redundant segments from a set of segments identified as similar to a designated segment (e.g., eliminating redundant secondary information segments that are similar to a displayed primary information segment).

Identification of the relatedness of primary information segments can be accomplished by determining the degree of similarity between the primary information segment being displayed and each other primary information segment. The degree of similarity can be determined using any appropriate method, such as, for example, relevance feedback. The use of relevance feedback to determine the similarity between two segments is discussed in more detail below with respect to the determination of the relatedness of primary and secondary information segments (see, in particular, section IV.B.2. below). The use of relevance feedback necessitates that sets of text data that represent the primary information segments be created (by, for example, using a conventional speech recognition method to create a transcript of the spoken portion of the audio data set) if such sets of text data do not already exist (e.g., a closed-caption transcript).

When the thumbnails 203a, 203b, 203c, 203d are keyframes, each keyframe should be representative of the video content of the segment being identified. Each keyframe can be, for example, a video frame selected from the video data representing the segment. The keyframe can be selected from the video data in any appropriate manner.

For example, the keyframe can be a video frame that occurs at a specified location within the video data of the segment. In a particular embodiment of the invention in which the primary information comprises television news stories, a video frame that occurs one tenth of the way through the video data representing the news story is selected. One tenth was chosen because it was determined empirically that video frames of particular relevance to the content of a television news story tend to occur at about that point in the television news story.

Alternatively, the keyframe can be selected based upon an analysis of the content of the video data. One method of accomplishing this is described in detail in the commonly owned, co-pending U.S. patent application entitled "A Method of Compressing a Plurality of Video Images for Efficiently Storing, Displaying and Searching the Plurality of Video Images," by Subutai Ahmad, Ser. No. 08/528,891, filed on Sep. 15, 1995, the disclosure of which is incorporated by reference herein. In that method, the content of each video frame is represented by a vector. The vector can comprise, for example, the discrete cosine transform (DCT) coefficients for the video frame, as known to those skilled in the art of video image analysis. (The DCT coefficients indicate, for example, how much objects in a video frame have moved since the previous video frame.) From the vectors for all of the video frames of the video data of the segment an average vector is determined. The keyframe is selected as the video frame that is represented by a vector that is closest to the average vector for the video data. This method of selecting a keyframe can be advantageous as compared to the arbitrary selection of a video frame that occurs at a specified location within the video data, wince it is likely to result in the selection of a video frame that is more representative of the video content of the segment.

Rather than selecting a single video frame from the video data to be the keyframe, multiple keyframes can be identified from the video data and the keyframes "tiled," i.e., presented together adjacent to each other. Or, the video data can be analyzed and a composite video frame synthesized from the video data. Any technique for synthesizing a video frame or frames can be used.

The keyframe may also be a video frame or frames that are not selected from the video data. For example, a representative video image (e.g., one or more video frames) can be selected from a library of video images. For instance, a news story about baseball could be represented by a keyframe showing a batter swinging at a pitch. Such selection can be done manually, i.e., at some point, a person reviews or is made aware of the content of the segment and, based upon that knowledge, associates a video image from the library with the segment. Alternatively, such selection can be accomplished automatically (meaning, here, without human intervention, except to establish the criteria for the selection process) by analyzing the audiovisual data of the segment (e.g., with an appropriately programmed digital computer) to ascertain the content of the segment and, based upon that analysis, associating a video image from the library with the segment. The content of the segment could be determined, for example, using a categorization method as described in more detail below. The segment to be categorized could either be compared to previously categorized segments that can be displayed by the system of the invention, or to a library of "control segments", each of which contain words germane to a particular subject.

The GUI 200 can be implemented, using conventional interface methods, so that a user of a system of the invention can select (e.g., by pointing and clicking with a mouse) one of the thumbnails 203a, 203b, 203c, 203d to cause the corresponding primary information segment to be displayed. (The map in the primary information map region 202 is adjusted accordingly.)

5. Related Secondary Information

The related secondary information region 204 of the GUI 200 provides the user information from a secondary information source or sources, the secondary information being related to the primary information currently being displayed. Though the region 204 includes two secondary information displays 204a, 204b, generally, the region 204 can include any number of secondary information displays. Further, as with the thumbnails 203a, 203b, 203c, 203d of the related primary information region 203, the secondary information displays 204a, 204b can take any form. For example, the secondary information displays 204a, 204b could be single video images, moving video images or sets of text. (As shown in FIG. 2B, the related secondary information region 214 of the GUI 210 includes three sets of text that each are a story from a text news source.) Other possibilities exist for the secondary information displays 204a, 204b, as known to those skilled in the art. As the segment of primary information being displayed changes, the secondary information displays 204a, 204b typically change as well. As indicated above, segments of secondary information that are related to the primary information that is being displayed can be identified in a manner discussed in more detail below. The system according to the invention can also be implemented so that the user can cause various parts of the secondary information displays 204*a*, 204*b* to be displayed, e.g., the user can be enabled to scroll up and down through a set of text or move back and forth through a video clip, using conventional GUI tools such as mouse pointing and clicking.

B. Other User Interface Techniques

User interface techniques other than GUI can be used with the invention. For example, rather than using GUI "buttons" (as illustrated in the primary information playback control region 211 of the GUI 210 of FIG. 2B), the manner in which the primary information is displayed could be controlled using a rotating knob device. Rotation of the knob in one direction could cause the display of the primary information to move forward (play); rotation of the knob in the other direction could cause the display of the primary information to move backward (rewind). Further, the knob could be constructed so that as the knob is rotated the user feels detents at certain points in the rotation. Each detent could correspond to a particular apparent display rate of the display. For example, when the knob is positioned in a home position, the display is stopped. When the knob is rotated clockwise, the display moves forward, the first detent in the clockwise direction causing the display to occur at a normal display rate, the second detent specifying a target apparent display rate of, for example, 1.5 times the normal display rate, the third detent specifying a target apparent display rate of, for example, 2.0 times the normal display rate, and so on. Similarly, when the knob is rotated counterclockwise, the display moves backward (i.e., in a chronological direction opposite that in which the display normally progresses). The first detent corresponds to normal display rate, the second detent specifies a target display rate of, for example, 1.5 times the normal display rate, and so on. The maximum rotation of the knob in either direction could be limited, the maximum rotation corresponding to a maximum target apparent display rate. The knob could be positioned at any position in between, thus allowing the target apparent display rate to be varied continuously between the maximum forward and backward display rates. The knob could also include a centrally located pushbutton to, for example, enable skipping from the display of one segment of the primary information to a next segment of the primary information. The knob could be constructed so that the position of the knob (or activation of the pushbutton) is transmitted to the remainder of the system using wireless communications, thus providing the user with relatively large freedom of movement during use of the system.

IV. Processing of Obtained Information

A. Information Acquisition

1. In General

Returning to FIG. 1, the system controller-103 causes data to be acquired from the primary information source 107 and the secondary information source 108, as described above. The data is acquired using methods and apparatus that are appropriate to the type of data being acquired. For example, the system controller 103 can acquire data representing television broadcasts using conventional equipment for receiving (e.g., a television set and antenna) and recording (e.g., a conventional videocassette recorder) television signals. Or, the system controller 103 can acquire data representing radio broadcasts using conventional equipment for receiving (e.g., a radio and antenna) and recording (e.g., a conventional audiotape recorder) radio signals. Or, the system controller 103 can acquire computer-readable data files (that can include text data, audio data, video data or some combination of two or more of those types of data), using conventional communications hardware and techniques, over a computer network (e.g., a public network such as the Internet or a proprietary network such as America Online™, CompuServe™ or Prodigy™) from an information providing site that is part of that network. In one particular embodiment of the invention, the system controller 103 acquires primary information including the television signals representing the content of designated television news broadcasts, and secondary information including computer-readable data files that represent the content of designated news stories from text news sources.

The data can be acquired according to a pre-established schedule (that can be stored, for example, by the data storage device 104). Data can be acquired at any desired frequency and the scheduled acquisition times specified in any desired manner (e.g., hourly, daily at a specified time, weekly on a specified day at a specified time, or after the occurrence of a specified event). The schedule can be used, for example, to program a videocassette recorder to record particular television programs at particular times. Likewise, the schedule can be used, for example, to appropriately program a computer to retrieve desired data files from particular network sites (e.g., by specifying an appropriate network address, such as a URL) of a computer network at specified times. In the latter case, if the device with which the system controller 103 is implemented is not operating (e.g., the computer is not turned on) at a time when a scheduled acquisition of data is to take place, the system controller 103 can be implemented so that all such data is immediately retrieved upon beginning operation of the device (e.g., turning the computer on). Further, connection over the network to the site or sites from which data is to be obtained can be accomplished by, for example, inserting a communications daemon into a startup file that is executed at the beginning of operation of the operating system of a computer used to implement the system controller 103. For example, if the computer uses a Windows operating system, the daemon can initiate a WinSock TCP/IP connection to enable connection to be made to the network site.

The acquired data must be stored. As indicated above, analog data (such as television or radio signals) can be stored on an appropriate medium, such as videotape or audiotape. Additionally, some or all of the data acquired by a system according to the invention is, if not already in that form, converted to digital data. The digital data can be stored on a conventional hard disk having adequate capacity, as described above. To minimize the amount of data storage capacity required, the digital data can be compressed using conventional techniques and equipment. Illustratively, a half hour television news program requires approximately 250 MB of hard disk storage capacity when the video is recorded using Adobe Premiere with Radius Studio compression at 15 fps and "high" quality capture at 240×180 resolution, and. the audio is recorded at approximately 22 kHz.

Appropriate rules can be established to handle situations in which the data storage device 104 (whether single or multiple devices) has insufficient data storage capacity to store new data. For example, the oldest data can be deleted, as necessary, to make room for new data. For example, in the particular embodiment of the invention in which the primary information is the content of designated television news programs and the secondary information is the content of designated text news stories, as new television news programs are recorded, the oldest stored programs can be deleted as necessary to make space to store the new programs, and text stories that are older than a specified length of time (e.g., several days) are automatically deleted.

The GUI 200 (FIG. 2A) can also include a mechanism for enabling the user to specify the particular information desired, i.e., specify particular information providers (e.g., news networks, such as CNN, NBC, ABC or CBS, or information services, such as Clarinet™) and data acquisition schedules for both the primary information source 107 and the secondary information source 108. This could be implemented, for example, using a set of nested menus, as known by those skilled in the art.

2. Recording/Playback Mediation

A system according to the invention may be instructed to acquire new information at the same time that the system is instructed to display other information. However, limitations of the devices or configuration of the system of the invention can impede or prevent such simultaneous acquisition and display. For example, the operating speed of a hard disk used to store the data describing the acquired information can limit the capacity of the system for such simultaneous operation: for typical amounts of audiovisual data, current conventional hard disks may not operate at a speed that is adequate to enable the simultaneous storing of data to, and accessing of stored data from, the hard disk.

Thus, in one embodiment of the invention, when data acquisition is scheduled to begin at a time when the system of the invention is being used for information display, a conventional graphical user interface mechanism (e.g., a dialog box) is used to alert the user of the system to the conflict and offer a choice between continuing with the display (thus delaying or eliminating the data acquisition) or ending the display and allowing the data acquisition to occur.

In another embodiment of the invention, the user can be alerted of an impending data acquisition at some predetermined time before the data acquisition is scheduled to begin. Similar to the choice described above, the user can be presented with a choice to continue with the display at that time or allow the data acquisition to occur. The system of the invention can default to one or the other modes of operation (i.e., data acquisition or display) if the user does not make a selection.

Or, the hard disk operating speed limitation described above can be alleviated or overcome by using multiple hard disks so that if data acquisition begins at a time when data is being accessed for use in generating a display, the newly acquired data is stored to a hard disk that does not contain any previously stored data (or that, based upon evaluation of one or more predetermined rules, does not contain data that is expected to be accessed during the time that the new data is being acquired), thus ensuring that data access and data storage will not occur simultaneously for a single hard disk. Alternatively, the hard disk operating speed limitation can be addressed by using only some portion of the available data to generate the information display, thus freeing more time for use in storing data to the hard disk. However, this latter approach may decrease the fidelity of the display unacceptably.

In a similar approach to the two hard disk approach described above, the data being acquired can be stored on a data storage device of one type, while the data to be used for generating a display is accessed from a data storage device of another type. For example, incoming television signals could be stored on a videocassette tape by a VCR, while digital data from previous television transmissions is retrieved from a hard disk for use in generating a television display of the previously acquired data. The data recorded by the VCR could be digitized at a later time and stored on the hard disk for subsequent use (which use may also occur at a time at which incoming television signals are being acquired by the VCR).

B. Information Structuring

Typically, the data representing the primary and secondary information are not provided from the primary and secondary information sources in a form that enables the various aspects of the invention described herein to be realized. Thus, it is necessary or desirable to "structure" the data (i.e., to organize and categorize the data, and relate particular data to other data) in useful ways. Below are described several aspects of such data structuring that can be implemented as part of the invention.

1. Partitioning

The primary and secondary information can be, and typically are, divided ("partitioned") into smaller related sets of information. Of particular utility for the invention is the identification within the primary and secondary information of contiguous related sets of information that typically concern a single theme or subject and that can be delineated in some manner from adjacent information. Herein, each such contiguous related set of information can be referred to as a "segment" of the primary or secondary information. (Note that, in the description below—see section IV.C.1.—of skimming an audiovisual display, "segment" is used in a different way; there, "segment" represents a contiguous portion of a set of audio data that occurs during a specified duration of time.) Segments within the primary information are "primary information segments" while segments within the secondary information are "secondary information segments." For example, if the primary information includes the content of several news programs, the primary information can be divided into particular news programs and each news program can further be broken down into particular news stories within the news program, each news story being denoted as a segment. Similarly, if the secondary information includes content from several text sources, the secondary information can be divided into particular text sources and each text source can be further divided into separate text stories, each text story being denoted as a segment. Note that a "segment" may sometimes, strictly speaking, not be contiguous in time (though it is contiguous in content). For example, a news story that is interrupted by a commercial break, then continues after the commercial break, may be defined as a single segment, particularly if the body of information is modified so that commercial breaks—and other extraneous portions of the body of information—are eliminated (an approach that, generally, is preferred, though such portions could also be treated as segments).

Partitioning the primary and secondary information into segments is useful for a variety of reasons. For example, each segment of the primary information can be identified within the data storage device which stores the data representing the primary information, in a manner known by those skilled in the art (e.g., by maintaining a table of segment identifiers and associated locations of the beginning of the identified segment), thus enabling the primary information segments to be accessed randomly so that the user can change the displayed segment freely among the primary information segments. Such identification of primary information segments also enables the creation of the map region 202 of the GUI 200 (FIG. 2). Further, each segment of the primary information can be correlated, as described in more detail below, with segments of the secondary information, thereby enabling one or more secondary information segments that are sufficiently related to a primary information segment to be displayed at the same time that the primary information segment is displayed. As also described in more detail below, the correlation of primary information segments with secondary information segments can also be used to categorize the primary information segments according to subject matter, thus enabling the user to sort or to cause display of segments of the primary information that pertain to a particular subject matter category (see the discussion of the topic buttons 215 in the playback control region 211 of the GUI 210 shown in FIG. 2A).

Generally, partitioning of a set of data requires some analysis of the data to identify "breaks" within the data, i.e., differences between adjacent data that are of sufficient magnitude to indicate a significant change in the content of the information represented by the data. A break may signify a demarcation of one segment from another, but need not necessarily do so: a break may also signify, for example, a change in the video image within a segment or a change of speakers within a segment. Methods for enabling identification of breaks that constitute segment demarcation are discussed in more detail below.

Partitioning of text data is often straightforward. For example, bodies of information that are collections of segments (e.g., stories) from text sources that are represented as computer-readable data typically include markers that identify the breaks between segments. Similarly, text transcripts of bodies of information represented as a set of audiovisual information also frequently include markers that identify breaks between segments of the information. For example, closed caption text data that can accompany the audio and video data of a set of audiovisual data often includes characters that indicate breaks in the text data (most news broadcasts, for example, include closed caption text data containing markers that designate story and paragraph boundaries, the beginning and end of advertisements, and changes in speaker) and, in particular, characters that explicitly designate breaks between segments (e.g., markers that identify story boundaries). Partitioning of such text data, then, requires only the identification of the location (e.g., if the text transcript of a set of audiovisual data is time-stamped, the time of occurrence) of the markers within the text data.

Where such markers are not present, the text data can be partitioned based upon analysis of the content of the text data. In a set of audiovisual data, breaks between segments can be determined, for example, based upon identification of the occurrence of a particular word, sequence of words, or pattern of words (particularly words that typically indicate a transition), and identification of changes in speaker. As one illustration, in a news program, phrases of the form, "Jane Doe, WXYZ news, reporting live from Anytown, USA," can indicate a break between segments.

Partitioning of audio and video data typically requires some non-trivial analysis of the data. The partitioning of audio and video data in accordance with the invention can be accomplished in any suitable manner. Some examples of methods that can be used to accomplish partitioning of audio or video data are described below. (These methods are applicable to digital data; thus, if the primary information is initially analog, it must be digitized before partitioning.) Typically, the audio and video data are synchronized as a result of having been recorded together. Thus, partitioning of either the audio or the video data will result in a corresponding partitioning of the other of the audio and video data. However, if the audio and video data are not synchronized, then such synchronization must be accomplished, in addition to partitioning one of the audio or video data, so that the other of the audio and video data can be partitioned in like manner.

Partitioning of audio data can be accomplished in any of a number of ways. For example, the audio data can be partitioned using a known voice recognition method. A voice recognition method that could be used with the invention is described in "A Gaussian Mixture Modeling Approach to Text-Independent Speaker Identification," by Douglas Reynolds, PhD thesis, Dept. of Electrical Engineering, Georgia Institute of Technology, 1992, the disclosure of which is incorporated by reference herein. Voice recognition methods can be tailored to, for example, identify a break in the audio data when a particular voice speaks, when a particular sequence of voices speak, or when a more complicated occurrence of voices is identified (e.g., the occurrence of two voices within a specified time of each other, or the occurrence of a voice followed by a silence of specified duration). Illustratively, when the invention is implemented as a news browser, a break between news stories could be identified when a particular newscaster's voice is followed or preceded by a silence of specified duration.

Or, the audio data can be partitioned using a known word recognition method. For example, a conventional speech recognition method (a large variety of which are known to those skilled in that art) can be used to enable identification of words. The identified words can then be analyzed in the same manner as that described above for analysis of text data, e.g., transition words or speaker changes can be used to indicate breaks. Illustratively, when the invention is implemented as a news browser, a break between news stories could be identified when one of a set of particular word patterns occurs (e.g., "we go now to", "update from", "more on that").

Audio data can also be partitioned using music recognition, i.e., a break is identified when specified music occurs. A method for partitioning audio data in this way is described in detail in the commonly owned, co-pending U.S. patent application entitled "System and Method for Selective Recording of Information," by Michelle Covell and Meg Withgott, Ser. No. 08/399,482, filed on Mar. 7, 1995, the disclosure of which is incorporated by reference herein. Partitioning of audio data using music recognition can be particularly useful when transitions between segments of the body of information are sometimes made using standard musical phrases. Illustratively, when the invention is implemented as a news browser, music recognition can be used to partition certain news programs (e.g., The MacNeil/Lehrer news hour) which use one or more standard musical phrases to transition between news stories.

Another method for partitioning audio data is pause recognition. Pause recognition is based on the assumption that a pause occurs at the time of a significant change in the content of the primary information. For many types of information, such as news programs, this is a workable assumption. A break is identified each time a pause occurs. A pause can be defined as any period of silence having greater than a specified magnitude.

Video data can be partitioned, for example, by searching for scene breaks, a method similar to the pause recognition method for partitioning audio data discussed immediately above. One method of accomplishing this is described in detail in the above-mentioned U.S. patent application entitled "A Method of Compressing a Plurality of Video Images for Efficiently Storing, Displaying and Searching the Plurality of Video Images," by Subutai Ahmad. In that method, the content of each video frame is represented by a vector, as described above. The vector for each video frame is compared to the vector of the immediately previous video frame and the immediately subsequent video frame, i.e., vectors of adjacent video frames are compared. In one approach, a break is identified each time the difference between the vectors of adjacent video frames is greater than a predetermined threshold. In another approach, a predetermined number of partitions is specified and the video frames are partitioned to produce that number of partitions (the partitioning can be accomplished by considering each video frame to be initially partitioned from all other video frames and recursively eliminating the partition between partitioned video frames having the least difference, or considering none of the video frames to be partitioned and recursively establishing partitions between unpartitioned video frames having the greatest difference).

Other approaches to scene break identification could be used, as known by those skilled in the art of processing video images. Some other approaches to scene break identification are discussed in "Automatic Parsing of News Video," by HongJiang Zhang, Gong Yihong, Stephen W. Smoliar, and Tan Ching Yong, IEEE Conference on Multimedia Computing and Systems, Boston, May 1994, the disclosure of which is incorporated by reference herein. For example, scene breaks could be identified based upon the magnitude of the overall changes in color of the pixels of adjacent video frames (a color change having a magnitude above a specified threshold is identified as a scene break). Or, scene breaks could be identified based upon the magnitude of the compression ratio for a particular set of adjacent video frames (a relatively small amount of compression indicates a relatively large change between video frames and, likely, a change in scenes, i.e., a scene break).

The above-described methods for partitioning audio or video data directly may not, by themselves, enable identification of segment breaks to be accomplished easily or at all. For example, without augmentation, pause recognition or scene break identification typically are not implemented in a manner that enables distinguishing between segment breaks and other breaks. Voice recognition may not, alone, be a reliable indicator of segment breaks, since switches in speaker often occur for reasons unrelated to a segment break. Word recognition, too, may be erratic in determining segment breaks; it also requires obtaining a text transcript of the audio. Music recognition works well only with a limited number of information sources, i.e., information sources that use well-defined musical transitions.

It may be possible to include markers (similar to those discussed above with respect to closed caption. text data) in either audio or video data that directly identify segment or other breaks within the audio or video data. The invention contemplates use of such markers to segment audio and/or video data.

If a set of audiovisual data also includes text data (e.g., a closed caption transcript of the spoken audio), it is possible to partition the audiovisual data by partitioning the text data, then using the partitioned text data to partition the audio data and video data in a corresponding manner. Even if the audiovisual data does not initially include text data, the text data can be produced using a speech recognition method. The text data can be partitioned using any appropriate method, as described above.

Typically, the text data, audio data and video data are each time-stamped. Theoretically, then, once segment breaks are determined in the text data, the time-stamps of the beginning and end of each segment within the text data could be used directly to identify segment breaks within the audio data and/or video data. However, in practice, the text data is typically not exactly synchronized with the audio data and video data (e.g., the text data of a particular segment may begin or end several seconds after the corresponding audio or video data), making such a straightforward approach infeasible. Nevertheless, the time-stamps of the segment breaks in the text data can be used to enable synchronization of those segment breaks with the corresponding segment breaks in the audio and video data. Such synchronization can be accomplished using any appropriate technique. Some possible approaches are described below.

One way to partition the audio and video data based upon the partition of the text data is to use a synchronization of the complete set of audio data with the complete set of text data, and a synchronization of the complete set of audio data with the complete set of video data to identify the partitions in the audio and video data. The latter synchronization typically exists as a consequence of the manner in which the audio and video data is obtained. However, synchronization between the text data and the audio data frequently does not already exist, and, if it does not, obtaining such synchronization can be computationally expensive. Further, it is not necessary to synchronize all of the text data with the audio and video data, but, rather, only the locations of the segment breaks.

A simpler approach is to determine the segment breaks in the audio and video data from the segment breaks in the text data based upon a rule or rules that exploit one or more characteristics of the body of information. Such a rule might be based on an observation that segment breaks in the audio and/or video data of a set of audiovisual data bear a relatively fixed relationship to the corresponding segment breaks in the corresponding text data. For example, it was observed that the video data of a news story from an audiovisual news program frequently begins about 5 to 10 seconds before the closed caption text data of the news story. Thus, in one embodiment of news browser implementation of the invention, the beginning of the video data of a news story is assumed to be 4 seconds prior to the closed-caption text data. This enables most of the relevant video data to be captured, while reducing the possibility of capturing extraneous video. This approach was found to be accurate within 2 seconds for CNN Headline News and the news programs of the NBC, ABC and CBS television broadcasting networks.

Figure 3:
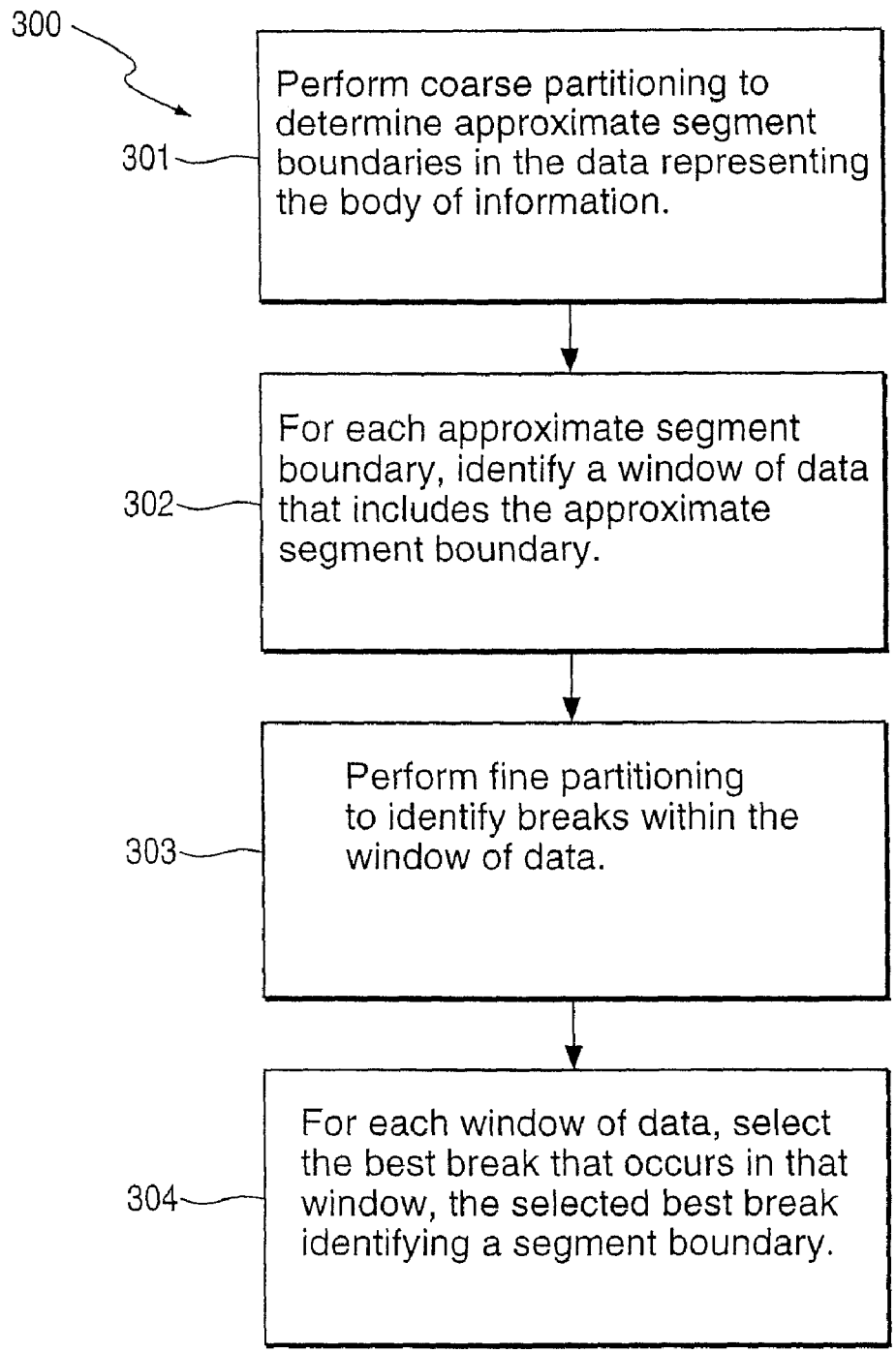
FIG. 3 is a flow chart of a method in accordance with the invention for identifying the boundaries of segments in a body of information.

In some cases, the approach may still not produce as good a result as desired, i.e., the segmentation of the audio and video data is not as crisp as desired, either deleting part of the beginning or end of the audio or video segment, or including extraneous audio or video as part of the segment. Thus, according to another particular embodiment of the invention, partitioning of audiovisual data that includes text data in which segments breaks are explicitly designated by markers within the text data can be accomplished in two steps: a first, coarse partitioning followed by a second, fine partitioning. FIG. 3 is a flow chart of a method 300, in accordance with this aspect of the invention, for identifying the boundaries of segments in a body of information. In the coarse partitioning step 301 of the method 300, the time-stamps associated with the segment breaks in the text data can be used to approximate the location of the corresponding segment breaks in the audio and video data, as described above. In step 302, a window of data (e.g., audio or video data in the context of the current discussion) that includes the approximate segment boundary is specified. This can be accomplished, for example, by specifying a time range that includes the time associated with the segment break in the text data (e.g., the time of occurrence of the segment break in the text data plus or minus several seconds) and identifying audio and/or video data that falls within that time range from the time-stamps associated with the audio and/or video data. The fine partitioning step 303 can then be used to identify breaks within the audio and/or video data. The fine partitioning can be accomplished using any appropriate method, such as one of the above-discussed methods (i.e., scene break identification, pause recognition, voice recognition, word recognition, or music recognition) to identify breaks in audio and video data. The fine partitioning can be performed on the entire set of audio data or video data, or only on the audio or video data that occurs within the time range. In the step 304, the data within the time range can then be examined to identify the location of a break or breaks within the time range. If more than one break is identified, the "best" break, measured according to the criteria of the partitioning method used, can be identified as the segment break, or the break occurring closest in time to the approximate segment break can be identified as the segment break.

Once the segment breaks in the audio or video data are identified, segment breaks in the other of the audio or video data can be determined using a synchronization of the audio and video data, as discussed above. Pointers to the segment breaks in the text data, audio data and/or video data can be maintained to indicate the beginning and end of each segment, thus enabling random access to segments within a body of information (e.g., news stories within a news program), as discussed in more detail above. The identified segments can also be used to enable other features of the invention, as described in more detail below.

2. Correlation

As mentioned above, the related secondary information region 204 of the GUI 200 is used to provide the user, from a secondary information source or sources, information that is related to the primary information currently being displayed. Thus, it is necessary to determine which of the segments of the secondary information are sufficiently related to the primary information segment displayed on the primary display device 102 to be displayed in the related secondary information region 204. This can be accomplished by determining the degree of similarity between each segment of the primary information (e.g., news story from an audiovisual news program) and each segment of the secondary information (e.g., text story from a text news source), and displaying in the related secondary information region 204 of the GUI 200 certain secondary information segments that are most similar to the primary information segment that is being displayed by the primary display device 102.

An important aspect of the invention is the capability to determine relatedness of segments of information represented by two different types of data. In particular, the invention can enable the determination of relatedness between segments of information represented by audiovisual data (such as is frequently the case for the primary information that can be displayed by the invention) and segments represented by text data (such as is generally the case for the secondary information as described particularly herein). This aspect of the invention enables the display of the related secondary information region 204 to be generated. It can also enable categorization of uncategorized segments, as described further below.

Figure 4:
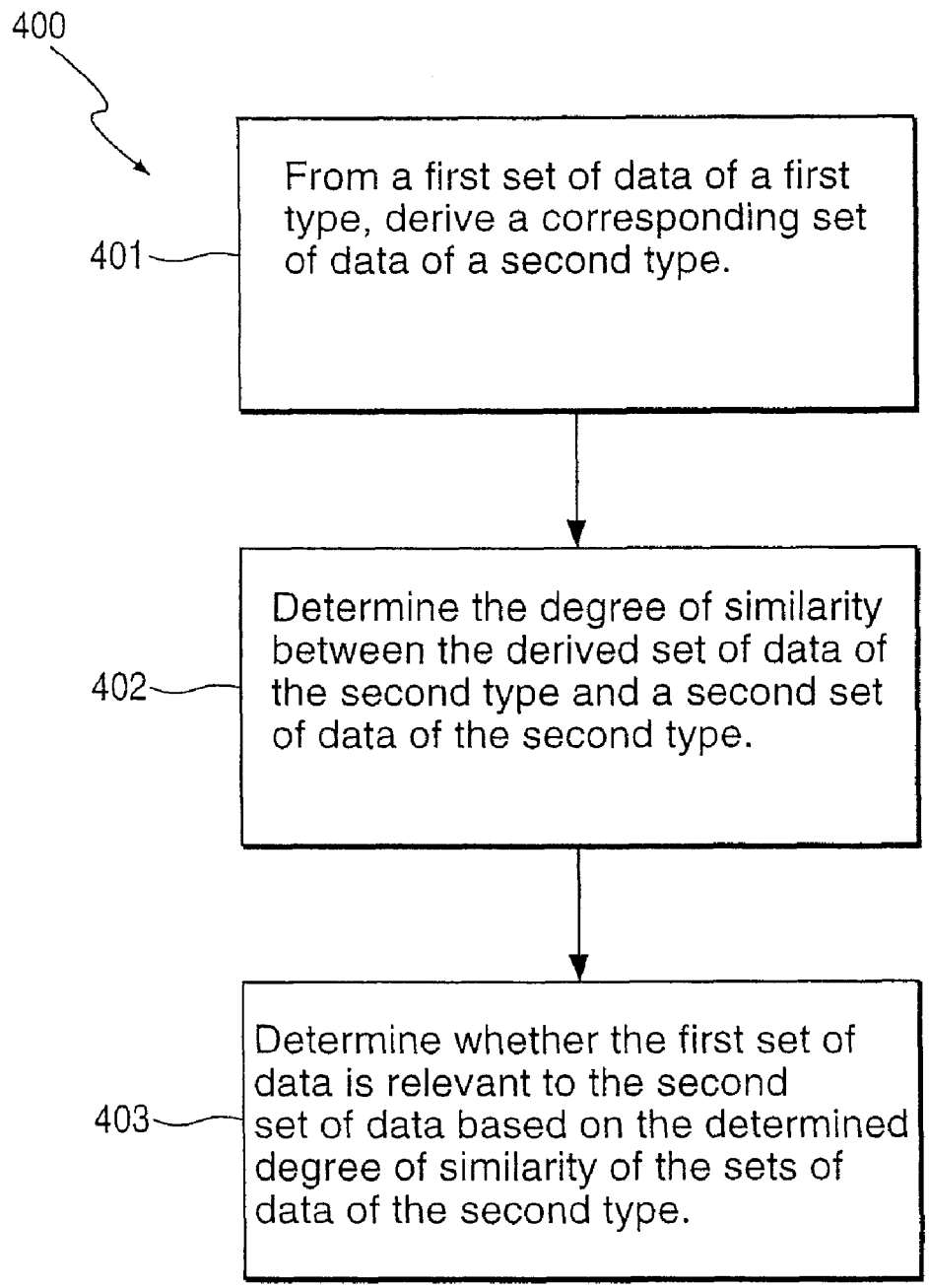
FIG. 4 is a flow chart of a method in accordance with the invention for determining whether a first set of information represented by data of a first type is relevant to a second set of information represented by data of a second type.

FIG. 4 is a flow chart of a method 400, in accordance with this aspect of the invention, for determining whether a first set of information represented by a first set of data of a first type (e.g., audiovisual data) is relevant to a second set of information represented by a second set of data of a second type (e.g., text data). In step 401, a set of data of the second type is derived from the first set of data of the first type. In a typical application of the method 400, step 401 causes a set of text data to be produced from a set of audiovisual data. The set of text data can be produced in any appropriate manner. For example, "production" of the set of text data may be as simple as extracting a pre-existing text transcript (e.g., a closed caption transcript) from the set of audiovisual data. Or, the set of text data can be produced from the set of audio data using a conventional speech recognition method. In step 402, the derived set of data (of the second type) is compared to the second set of data of the second type to determine the degree of similarity between the derived set of data and the second set of data. One way of making this determination is described in more detail below. In step 403, a determination is made as to whether the first set of data is relevant to the second set of data, based on the comparison of step 402. Typically, a threshold level of similarity (the expression of which depends upon the method used to determine similarity) is specified so that only sets of information that are sufficiently related to each other are identified as related. (This means, when the method 400 is used to generate the related secondary information region 204, that less than the allotted number of secondary information segments—or even no secondary information segments—may be displayed.)

The degree of similarity can be determined using any appropriate method, such as, for example, relevance feedback. In relevance feedback, a text representation of each segment to be compared (e.g., each audiovisual news story or text story) is represented as a vector, each component of the vector corresponding to a word, the value of each component being the number of occurrences of the word in the segment. (Two words are considered identical—i.e., are amalgamated for purposes of ascribing a magnitude to each component of the vector representing the textual content of a segment—if the words have the same stem; for example, "play", "played" and "player" are all considered to be the same word for purposes of forming the segment vector.) For each pair of segments, the normalized dot product of the vectors corresponding to the segments is calculated, yielding a number between 0 and 1. The degree of similarity between two segments is represented by the magnitude of the normalized dot product, 1 representing two segments with identical words and 0 representing two segments having no matching words. The use of relevance feedback to determine the similarity between two text segments is well-known, and is described in more detail in, for example, the textbook entitled *Introduction to Modern Information Retrieval*, by Gerard Salton, McGraw-Hill, New York, 1983, the pertinent disclosure of which is incorporated by reference herein. Relevance feedback is also described in detail in "Improving Retrieval Performance by Relevance Feedback," Salton, G., Journal of the American Society for Information Science, vol. 41, no. 4, pp. 288-297, June 1990 as well as "The Effect of Adding Relevance Information in a Relevance Feedback Environment," Buckley, C. et. al., Proceedings of 17th International Conference on Research and Development in Information Retrieval, DIGIR 94, Springer-Verlag (Germany), 1994. pp. 292-300, the disclosures of which are incorporated by reference herein.

The related secondary information region 204 of the GUI 200 can display a predetermined number of relevant secondary information segments. Generally, it is desirable to display the secondary information segments that are most similar to the primary information segment that is being displayed. While this can be accomplished straightforwardly by displaying those secondary information segments having the highest determined degree of similarity, such an approach may not be desirable in some situations. For example, the secondary information source may include segments that are identical or nearly identical (e.g., news stories are often repeated in a variety of text news sources with little or no change), so that display of the secondary information segments having the highest determined degree of similarity can result in undesirable redundancy.

This problem can be overcome by further determining the degree of similarity between each of a predetermined number of the secondary information segments having the highest determined degree of similarity (in one embodiment of the news browser implementation of the invention, the 10 most similar text stories are compared), and displaying only one of each pair of secondary information segments having a degree of similarity above a specified threshold, i.e., redundant secondary information segments are eliminated. Again, this can be more problematic than first appears. For example, a particular segment may have greater than the threshold degree of similarity when compared to each of second and third segments, but the second and third segments may have less than the threshold degree of similarity when compared to each other.

From the three segments, it would be desirable to show both the second and third segments. However, if the first segment is compared to the second segment or the third segment, and the second or third segment discarded, before comparison of the first segment to the other of the second or third segment (which will also result in discarding of one of the compared segments), then only one of the three segments will be shown. Such a situation could be handled by, for example, calculating the similarity between all pairs of the predetermined number of secondary information segments, and performing comparisons that reveal the situation described above before discarding any of the secondary information segments.

3. Categorizing

An important aspect of the invention is the capability to categorize uncategorized segments of information based upon the categorization of previously categorized segments of information. In particular, if the segments of the secondary information have been categorized according to subject matter, then the degree of similarity between the subject matter content of segments of the primary information (e.g., news stories in audiovisual news programs) and segments of the secondary information (e.g., news stories from text news sources) can also be used to categorize the primary information according to subject matter. This can be useful to enable determination of which primary information segments fall within a particular subject matter category that corresponds to one of the topic buttons 215 (FIG. 2) that a user can select to cause all primary information segments that pertain to the selected subject matter category to be displayed one after the other by the primary display device 102 (FIG. 1). Though this aspect of the invention has particular utility in categorizing primary information segments based upon the categorization of pre-existing secondary information segments, it can generally enable any categorized segments to be used to categorize uncategorized segments.

Figure 5:
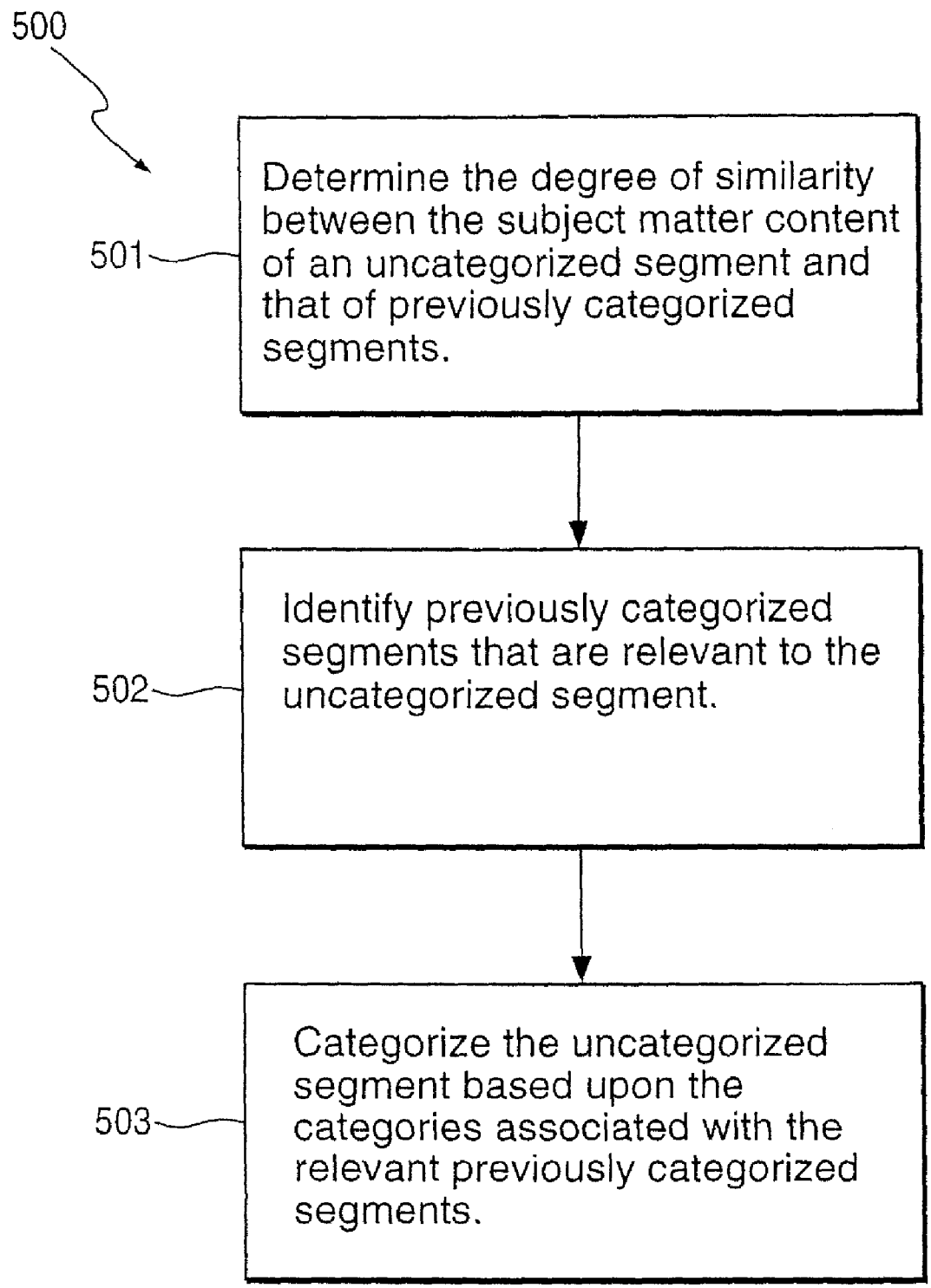
FIG. 5 is a flow chart of a method in accordance with the invention for categorizing according to subject matter an uncategorized segment of a body of information based on the categorization of other previously categorized segments of the body of information.

FIG. 5 is a flow chart of a method 500, in accordance with this aspect of the invention, for categorizing according to subject matter an uncategorized segment of a body of information based on the subject matter categorization of other previously categorized segments of the body of information. For example, each story from the Clarinet™ news service is categorized according to the subject matter of the story by associating one or more predefined subject matter categories (e.g., sports, travel, computers, business, international news) with the story. This subject matter categorization can be used to categorize news stories from audiovisual news programs based on the similarity between each audiovisual news story and text stories from the Clarinet™ news service. Below, such categorization of audiovisual news stories is described as an example of how categorizing segments of primary information can be accomplished in accordance with the invention.

The subject matter category or categories associated with each Clarinet™ text story are acquired as part of the acquisition of the text stories themselves and can, for example, be stored in a relational database in a memory that is part of the system controller 103 (FIG. 1). It may be desirable to associate only one subject matter category with each text story. For example, the most salient subject matter category can be identified in any appropriate manner and used as the sole subject matter category associated with the story. This may be done, for example, to increase the likelihood that the subject matter category eventually associated with each news story accurately describes the subject matter content of that news story.

In step 501 of the method 500, a determination is made as to the degree of similarity between the subject matter content of an uncategorized segment and that of previously categorized segments. The degree of similarity can be determined using any appropriate method, such as, for example, relevance feedback. When relevance feedback is used, it is necessary to obtain a textual representation of audiovisual data, if appropriate (i.e., if one or both of the segments is represented as audiovisual data) and not already existent.

In step 502, previously categorized segments that are relevant to the uncategorized segment are identified. Relevant segments can be identified based upon the degree of similarity in the same manner as that described above with respect to correlation of segments, e.g., segments having greater than a threshold level of similarity can be designated as relevant. Step 501 can also include elimination of redundant segments (in the same manner as described above) from among those that have the required degree of similarity to the uncategorized segment.

In step 503, the uncategorized segment is categorized based upon the subject matter categories associated with the relevant previously categorized segments. One or more subject matter categories can be associated with the uncategorized segment. Generally, the subject matter category or categories can be selected from the subject matter categories associated with the relevant previously categorized segments using any desired method. For example, the subject matter category or categories of the most similar previously categorized segment could be selected as the subject matter category or categories of the uncategorized segment. Or, the most frequently occurring subject matter category or categories associated with a predefined number of the most similar previously categorized segments (or previously categorized segments having greater than a threshold degree of similarity) could be selected as the subject matter category of the uncategorized segment. In the latter case, it may be particularly desirable, as described above, to determine the similarity between the relevant previously categorized segments, so that only one of a set of previously categorized segments that are substantially identical to each other influences the categorization of the uncategorized segment.

C. Information Presentation

Above, the acquisition of information and the structuring of acquired information has been described. The information must, of course, also be displayed to a user. The information display has been described generally above with respect to FIGS. 2A and 2B. However, a system according to the invention can also include one or more of a variety of additional features that enhance the information display.

1. Skimming

As indicated above with respect to FIGS. 2A and 2B, the apparent display rate with which the primary information is displayed by the primary display device 102 can be varied by the user. Variation in the apparent display rate of an audiovisual display can be implemented by appropriately programming a digital computer to accomplish the functions of a method for varying the apparent display rate. Generally, any method for varying the apparent display rate can be used with the invention. As described elsewhere herein, the primary information will often be represented by coextensive sets of data of several types (audio, video, and, possible text). The particular method used to vary the apparent display rate of the primary information will typically depend upon the type of the set of data (e.g., audio, video, text) that is directly modified to produce appropriately modified data for use in generating a display of the primary information at the new apparent display rate. The method also preferably synchronizes the sets of data that are not directly modified with the set of data that is.

For example, the audio data can be modified to cause the apparent display rate of the audio display to be varied (either slowed down or speeded up) from a normal display rate and the video data synchronized with the modified audio data (resulting in a variation of the apparent video display rate that corresponds to the variation in the apparent audio display rate). Several methods of accomplishing such variation in the apparent display rate of an audiovisual display are described in detail in the commonly owned, co-pending U.S. patent application Ser. No. 10/783,627 entitled "Variable Rate Video Playback with Synchronized Audio," by Neal A. Bhadkamkar, Subutai Ahmad and Michelle Covell, filed on the same day as the present application, the disclosure of which is incorporated by reference herein. At least some of the methods described therein have the advantage that the apparent display rate of the audio can be varied while maintaining proper pitch (i.e., the voices don't sound stupefied when the display is slowed down or like chipmunks when the display is speeded up) and, therefore, intelligibility. A brief description of a general method described therein is given immediately below, followed by a brief description of one particular method for modifying the audio data.

Generally, in the methods described in the above-mentioned patent application, a correspondence between an original audio data set and an original video data set is first established. For example, the number of audio samples that have the same duration as a frame of video data can be determined and that number of audio samples defined to be an audio segment. (Note that, as mentioned above, as used here in the description of skimming, "segment" refers to a contiguous portion of a set of audio data that occurs during a specified duration of time; elsewhere herein, "segment" refers to a contiguous related set of information within the primary or secondary information that typically concerns a single theme or subject and that can be delineated in some manner from adjacent information.) The audio segments can be defined, for example, so that each audio segment corresponds to a single particular video frame. A target display rate (which can be faster or slower than a normal display rate at which an audiovisual display system generates an audiovisual display from the unmodified, original sets of audio and video data) is also determined. The target display rate can be a single value which remains unchanged throughout the display or a sequence of values such that the target display rate changes during the display. The original audio data set is manipulated, based upon the target display rate and an evaluation of the original audio data set, to produce a modified audio data set. As described below, the modified audio data set is produced so that, generally, when the modified audio data set is used to generate an audio display, the audio display appears to be speeded up or slowed down by an amount that is approximately equal to the target display rate. The correspondence between the modified audio data set and the original audio data set, and the correspondence between the original audio data set and the original video data set, are used to create a correspondence between the modified audio data set and the original video data set, which, in turn, is used to delete video data from, or add video data to, as appropriate, the original video data set to create a modified video data set. Once the modified audio and video data sets have been created, an audiovisual display can be generated from those modified data sets by an audiovisual display system, or the modified audio and video data sets can be stored on a conventional data storage device for use in generating a display at a later time. The audio and video data of the modified audio and video data sets are processed at the same rate as before (i.e., when the original audio and video data sets were used to generate a display at the normal display rate) by the audiovisual display system. However, since the modified audio and video data sets (in the usual case) have a different amount (either more or less) of data than the original audio and video data sets, the apparent display rate of the audiovisual display generated from the modified audio and video data sets is different than the normal display rate. Further, since the modified video data set is created based upon the content of the modified audio data set and a correspondence between the modified audio data set and the original video data set, the modified video data set is synchronized (at least approximately and, possibly, exactly) with the modified audio data set and produces a display of the same or approximately the same duration.

The audio data can be modified in any suitable manner; one way is described following. An audio data set is divided into non-overlapping segments of equal length. Generally, the beginning and end of each segment are overlapped with the end and beginning, respectively, of adjacent segments. (Note that the overlap can be negative, such that the length of the adjacent segments is extended. The audio data of corresponding overlapped portions of adjacent segments are blended and replaced by the blended audio data. The possible lengths of each overlap are constrained in accordance with a target overlap that corresponds to the specified target display rate. However, within this constraint, the length of each particular overlap is chosen so that the pitch pulses of the overlapped portions closely resemble each other. Consequently, the blending of the audio data of the overlapped portions does not greatly distort the sound corresponding to the overlapped portions of audio data. Thus, the invention enables the audio data set to be condensed or expanded a desired amount (i.e., the display of an audio data set can be speeded up or slowed down as desired), while minimizing the amount of distortion associated with the modification of the audio data set (i.e., the audio display sounds "normal").

Since the actual amount of overlap of segments can vary from the target overlap that corresponds to the specified target display rate, the actual apparent display rate can vary from the target display rate. Over relatively long periods of time (e.g., greater than approximately 0.5 seconds), the actual apparent display rate typically closely approximates the target display rate. Over shorter time periods (e.g., approximately 30 milliseconds), the actual apparent display rate can vary more substantially from the target display rate. However, these short term fluctuations are not perceptible to an observer. Thus, this method produces an actual apparent display rate that to an observer appears to faithfully track the target display rate over the entire range of the display.

Preferably, the computation required to produce a particular amount of variation in the apparent display rate is done at the time that the determination of a target display rate mandates such variation. This has the advantage of reducing the amount of data storage capacity required by a system of the invention. This also enables any magnitude of apparent display rate to be specified over a continuous range of allowed display rates, rather than restricting the magnitude of the apparent display rate to one of a set of discrete magnitudes within an allowed range, as would be necessary if all of the computations for each magnitude of apparent display rate were pre-computed. Additionally, this enables the apparent display rate of the display to be varied in real time.

2. Summarization

A system according to the invention can include another information presentation feature that enables the display of a primary segment or segments to be summarized. Summarization enables an observer to quickly get an overview of the content of a particular segment or segments of information. Summarization can be implemented by appropriately programming a digital computer to accomplish the functions of a summarization method. Generally, summarization can be accomplished using any appropriate method. As with skimming, discussed above, the particular method used will typically depend upon the type of the set of data (e.g., audio, video, text) that is directly modified to produce appropriately modified data for use in generating a summary display of the primary information. The method also preferably synchronizes the sets of data that are not modified directly with the set of data that is.

For example, text data that is part of, or derived from, audiovisual data that represents a primary segment can be summarized, and the corresponding audio and video data summarized based upon the text summary. One method of accomplishing such summarization is described in detail in the commonly owned, co-pending U.S. patent application Ser. No. 08/761,025 entitled "Indirect Manipulation Of Data Using Temporally Related Data, With Particular Application To Manipulation Of Audio Or Audiovisual Data," by Emanuel E. Farber and Subutai Ahmad, filed on the same day as the present application, the disclosure of which is incorporated by reference herein. A brief description of that method is given immediately below.

The text data of a set of audiovisual data represents a transcription of the spoken portion of the audio data and is temporally related to each of the audio and video data. The text data can be obtained in any appropriate manner, e.g., the text data can be pre-existing text data such as closed-caption data or subtitles, or the text data can be obtained by using any of a number of known speech recognition methods to analyze the audio data to produce the text data.

The text data is summarized using an appropriate summarization method. Generally, any text summarization method can be used; a particular example of a text summarization method that can be used with the invention is described in U.S. Pat. No. 5,384,703, issued to Withgott et al. on Jan. 24, 1995.

The unsummarized text data is aligned with the unsummarized audio data. If the text data has been obtained from the audio data using a speech recognition method, then the alignment of the unsummarized text data with the unsummarized audio data typically exists as a byproduct of the speech recognition method. Otherwise, alignment is accomplished in three steps. First, the unsummarized text data is evaluated to generate a corresponding linguistic transcription network (e.g., a network describing the set of possible phonetic transcriptions). Second, a feature analysis is performed on the audio samples comprising the unsummarized audio data set to create a set of audio feature data. Third, the linguistic transcription network is compared to the set of audio feature data (using Hidden Markov Models to describe the linguistic units of the linguistic transcription network in terms of audio features) to determine the linguistic transcription (from all of the possible linguistic transcriptions allowed by the linguistic transcription network) which best fits the set of audio feature data. As a result of this comparison, the audio features of the best fit linguistic transcription are correlated with audio features in the set of audio feature data. The audio features of the best fit linguistic transcription can also be correlated with the linguistic units of the linguistic transcription network. The linguistic units of the linguistic transcription network can, in turn, be correlated with the unsummarized text data. As a consequence of these correlations, an alignment of the unsummarized text data with the unsummarized audio data can be obtained. Using the previously determined text summary and the alignment between the text data and audio data, an audio summary can be produced.

A video summary can be produced from the audio summary using an alignment between the unsummarized audio data and the unsummarized video data. Such alignment can be pre-existing (because the audio data and video data were recorded together, the alignment being inherent because of the like time stamps associated with each of the audio and video data) or can be calculated easily (the time stamp for an audio sample or video frame can be calculated by multiplying the time duration of each sample or frame by the sequence number of the sample or frame within the audio data or video data).

Another method that can be used to summarize the display of a set of audiovisual information includes identifying and eliminating "sound bites" (defined below) in the audio portion of the primary information. The sound bites can be identified based upon analysis of a set of text data that corresponds to the spoken portion of the set of audio data. The text data can be obtained in any appropriate manner. For example, the text data may be closed caption data that is provided with the audio and video data representing the primary information. Or, the text data can be obtained from the set of audio data using conventional speech recognition techniques. Once the text data is obtained, the text data can be "pre-processed" using known methods to classify the words in the text data according to their characteristics, e.g., part of speech.

Herein, a "sound bite" is a related set of contiguous audio information that conforms to one or more predetermined criteria that are intended to identify short spoken phrases that are not spoken by a previously identified primary speaker and that represent information of little interest and/or are redundant. For example, in a news browser according to the invention, where the primary information includes the content of audiovisual news programs (e.g., television news programs), the predetermined criteria can be established so that spoken portions of the audio information that are likely not to have been spoken by a news anchorperson or a news reporter are identified as sound bites. Such criteria might include, for example, rules that tend to identify a spoken portion of the audio as a sound bite if the spoken portion includes slang words or the use of first person pronouns (e.g., I or we), both of which tend not to be present in the speech of an anchorperson or reporter. As can be appreciated, elimination of such audio portions will typically not significantly adversely affect the presentation of the essential content of a set of audio information, but will enable the set of audio information to be presented more quickly. (It should be noted that the summarization method of Withgott et al. was also found to be incidentally effective at eliminating sound bites.)

Once the audio data has been modified by eliminating the audio data corresponding to the sound bites, the set of modified audio data must be aligned (synchronized) with the video data (if present) to enable the video data to be modified to produce a speeded-up video display. As described above with respect to the summarization method of Farber and Ahmad, the audio/video alignment can either be pre-existing or calculated easily.

As can be appreciated, a summarization method such as one of those described above could be used in combination with a method for increasing the apparent display rate as described above (see section IV.0.1. above on Skimming) to even further condense the display of a set of primary information. For example, the set or sets of data representing the primary information could be modified to increase the apparent-display rate, then the modified set or sets of data could be summarized to produce a speeded-up summary of the set of primary information. Or, conversely, the set or sets of data representing the primary information could be summarized, then the summarized set or sets of data modified to increase the apparent display rate, thus producing a speeded-up summary of the set of primary information.

As can be appreciated, the methods described above for manipulating audiovisual data to produce a summarized display of the audiovisual data can also be used, with appropriate modification (e.g., instead of producing a summary of the text data, the text data could be manipulated in some other desired fashion), to manipulate the audiovisual data for some other purpose, such as rearranging, editing, selectively accessing or searching the audiovisual data.

3. Display Pause with Elastic Playback

A system according to the invention can include yet another information presentation feature that enables the display of an image to be paused, then, at the end of the pause, resumed at an accelerated rate (i.e., a rate that is faster than a normal display rate) until a time at which the content of the display corresponds to the content that would have been displayed had the image been displayed at the normal display rate without the pause, at which time display of the image at the normal display rate resumes. In other words, after a pause, the image display is speeded up so that the display "catches up" to where it would have been without the pause, then slowed back down to the normal display rate. The implementation of this feature is described in detail in the commonly owned, co-pending U.S. patent application Ser. No. 09/408, 759 entitled "Display Pause with Elastic Playback," by Subutai Ahmad, Neal A. Bhadkamkar, Steve B. Cousins, Paul A. Freiberger and Brygg A. Ullmer, filed on the same day as the present application, the disclosure of which is incorporated by reference herein. A brief description of the implementation is given immediately below.

The image to be displayed is represented by an ordered set of display data. This display data is acquired from a data source at a first rate. The display data is transferred to a display device at the first rate as the display data is acquired. An image is generated from the display data transferred to the display device and displayed on the display device. At some point, the user instructs the system to pause the display. The system identifies the pause instruction from the user and, in response, stops the transfer of display data to the display device and begins storing the acquired display data at the first rate. At some later time, the user instructs the system to resume the display. The system identifies the resume instruction from the user and, in response, begins transferring stored display data to the display device at a second, effective rate that is greater than the first rate. An image is generated from the stored display data transferred to the display device and displayed on the display device. While the stored display data is being transferred to the display device, the newly acquired data continues to be stored. The storage of display data finally stops when there is no more stored display data to be transferred to the display device, the amount of stored display data having gradually been reduced by transferal of the stored display data to the display device at the second, effective rate that is greater than the first rate at which the display data is stored. Once the storage of display data stops, the display data is again transferred to the display device at the first rate as the display data is acquired.

This feature of the invention enables a great deal of flexibility in observing a real-time display of audiovisual information. For example, the invention enables an observer to pause and resume the display as desired so that, if the observer wants to temporarily stop watching to go to the bathroom or to take a phone call, the observer can pause the display, then, after resuming the display upon return, watch the audiovisual information at an accelerated display rate until the display of the program catches up to where it would have been without the pause. Thus, the user can attend to other matters while the audiovisual information is being viewed, without sacrificing viewing any of the content of the audiovisual information or enduring the inconvenience of spending additional time to finish watching the audiovisual program. This feature of the invention can also be tailored to enable a user who has begun viewing the audiovisual information at a time later than desired, to observe the audiovisual information at an accelerated rate until the display catches up to the point at which the display have been if the audiovisual information had been viewed at a normal display rate beginning at the desired start time.

Various embodiments of the invention have been described. The descriptions are intended to be illustrative, not limitative. Thus, it will be apparent to one skilled in the art that certain modifications may be made to the invention as described without departing from the scope of the claims set out below.

We claim:

1. A method for reviewing multiple television programs, wherein at least one of the multiple television programs is received in real time, the method comprising:

displaying one of the multiple television programs to a user by a first display device;

simultaneous with the displaying of the one television program by the first display device, displaying primary and secondary information to the user in real time by a second display device, wherein the primary information is for controlling the multiple television programs, and wherein the secondary information is related to the one television program displayed by the first display device, and wherein the second display device is physically separate from and untethered to the first display device, the second display device includes a graphical user interface for displaying the primary information and the secondary information, the primary information enables the user to select among the multiple television programs for display by the first display, the primary information comprises a plurality of selectable segments related to the information being displayed on the first display device, the secondary information comprises a plurality of articles related to the information being displayed on the first display device, the secondary information is dynamically determined based upon the television program displayed by the first display device, and the secondary information is displayed in response to selection by the user of one of the multiple television programs;

selecting another television program using the primary information displayed by the graphical user interface of the second display device; and in response to the selection of the other television program by the user, displaying by the graphical user interface of the second display device secondary information related to the selected second television program, wherein upon selecting one of the plurality of segments from the primary information, the information being displayed on the first display device is changed, and the related secondary information displayed on the second display device changes accordingly.

2. The method of claim 1, wherein the other television program is a news television program, and wherein the secondary information is news information related to the news television program.

3. The method of claim 1, wherein the secondary information is dynamically determined based upon a threshold level of similarity with at least a portion of the television program displayed by the first display device.

4. The method of claim 1, further comprising displaying a program map displayable on the second display device, wherein the program map displays several linear graphical representations of program information, where subdivisions in each linear representation represent breaks between different stories within a program.

5. A non-transitory computer readable medium or media whose contents cause a computer system to perform a method for enabling review of multiple television programs, wherein at least one of the multiple television programs is received in real time, the method comprising:

displaying one of the multiple television programs to a user by a first display device;

simultaneous with the displaying of the one television program by the first display device, displaying primary and secondary information to the user in real time by a second display device, wherein the primary information is for controlling the multiple television programs, and wherein the secondary information is related to the one television program displayed by the first display device, and wherein the second display device is physically separate from and untethered to the first display device, the second display device includes a graphical user interface for displaying the primary information and the secondary information, the primary information enables the user to select among the multiple television programs for display by the first display, the primary information comprises a plurality of selectable segments related to the information being displayed on the first display device, the secondary information comprises a plurality of articles related to the information being displayed on the first display device, the secondary information is dynamically determined based upon the television program displayed by the first display device, and the secondary information is displayed in response to selection by the user of one of the multiple television programs;

selecting another television program using the primary information displayed by the graphical user interface of the second display; and in response to the selection of the other television program by the user, displaying by the graphical user interface of the second display device secondary information related to the selected second television program, wherein upon selecting one of the plurality of segments from the primary information, the information being displayed on the first display device is changed, and the related secondary information displayed on the second display device changes accordingly.

6. The computer readable medium or media of claim 5, wherein the other television program is a news television program, and wherein the secondary information is news information related to the news television program.

7. The computer readable medium or media of claim 5, further comprising displaying a program map displayable on the second display device, wherein the program map displays several linear graphical representations of program information, where subdivisions in each linear representation represent breaks between different stories within a program.

8. A system for acquiring and enabling the review of multiple television programs, wherein at least one of the multiple television programs is received in real time, the system comprising:

first means for acquiring in real time, or in near real time, one or more of the multiple television programs;

second means for acquiring in real time, or in near real time, internet content;

first display means for generating in real time, or in near real time, a display of one of the one or more multiple television programs as the one television program is acquired by the means for acquiring for display to a user;

means for comparing the one television program to the internet content to determine, according to one or more predetermined criteria, a set of internet content that is related to the one television program; and second display means for generating a display of a portion of, or a representation of, the set of internet content determined to be related to the one television program and for generating a display of information for controlling the multiple television programs for display to the user, wherein the second display means is physically separate from and untethered to the first display means, the second display means includes a graphical user interface for displaying the portion of or representation of the set of internet content and the information for controlling the multiple television programs, the information enables the user to select among the multiple television programs for display by the first display means, the information comprises a plurality of selectable segments related to the television programs being displayed on the first display means, the set of internet content comprises a plurality of articles related to the television programs being displayed on the first display means, the set of internet content is dynamically determined based upon the one television program, and the second display means displays the portion or representation of the set of internet content in response to the selection by the user of one of the multiple television programs, wherein upon selecting one of the plurality of segments from the information, the information being displayed on the first display means is changed, and the set of Internet content displayed on the second display means changes accordingly.

9. The system of claim 8, wherein the second display means displays a text display of a portion or representation of the set of internet content.

10. The system of claim 8, wherein:
the first display means is a television; and
the second display means is a computer display monitor.

11. The system of claim 8, further comprising means for selecting the set of internet content for which a portion or representation is displayed by the second display means, wherein selection of such set of internet content causes the first display means to display at least some of the selected set of internet content.

12. The system of claim 8, further comprising means for controlling operation of the system.

13. The system of claim 12, wherein the means for controlling is physically separate from the first display means.

14. The system of claim 13, wherein the means for controlling is portable.

15. The system of claim 13, further comprising means for enabling wireless communication between the first display means and the means for controlling.

16. The system of claim 12, wherein the means for controlling and the second display means are embodied in the same apparatus.

17. The system of claim 12, wherein the means for controlling comprises a graphical user interface for enabling specification of control instructions.

18. The system of claim 8, wherein the one television program is a news television program, and wherein the set of internet content is news internet content related to the news television program.

* * * * *